United States Patent
Okuda et al.

(10) Patent No.: US 11,320,045 B2
(45) Date of Patent: May 3, 2022

(54) ON-BOARD COMPONENT ABNORMAL SITE IDENTIFYING METHOD, ON-BOARD COMPONENT ABNORMAL SITE IDENTIFYING SYSTEM, ON-BOARD COMPONENT ABNORMAL SITE IDENTIFYING APPARATUS, ON-BOARD COMPONENT ABNORMAL SITE REPORT CONTROL APPARATUS, AND VEHICLE CONTROL APPARATUS

(71) Applicant: TOYOTA JIDOSHA KABUSHIKI KAISHA, Toyota (JP)

(72) Inventors: Koichi Okuda, Toyota (JP); Atsushi Tabata, Okazaki (JP); Kota Fujii, Nissin (JP); Ken Imamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/318,342

(22) Filed: May 12, 2021

(65) Prior Publication Data
US 2021/0364084 A1    Nov. 25, 2021

(30) Foreign Application Priority Data

May 20, 2020   (JP) .............................. JP2020-087962

(51) Int. Cl.
*F16H 61/12*   (2010.01)
*F16H 57/04*   (2010.01)
(Continued)

(52) U.S. Cl.
CPC .......... *F16H 61/12* (2013.01); *F16H 57/0405* (2013.01); *F16H 59/42* (2013.01);
(Continued)

(58) Field of Classification Search
CPC ...... F16H 57/0405; F16H 59/42; F16H 59/72; F16H 61/12; F16H 61/68; F16H 2061/1268; F16H 2061/1208; F16H 2061/1216
See application file for complete search history.

(56) References Cited

U.S. PATENT DOCUMENTS

2010/0312423 A1* 12/2010 Steinhauser ............ F16H 61/12
                                                                    180/65.265
2013/0342150 A1* 12/2013 Ozaki ................. F16H 57/0476
                                                                    318/490
(Continued)

FOREIGN PATENT DOCUMENTS

JP    2000-240784 A    9/2000
JP    2011-058510 A    3/2011

*Primary Examiner* — Edwin A Young
(74) *Attorney, Agent, or Firm* — Oliff PLC

(57) ABSTRACT

An on-board component abnormal site identifying method includes executing an acquisition process, a calculation process, and a reporting process by an execution device. The acquisition process is a process for acquiring, by the execution device, values of input variables. The mapping includes, as the input variables, a foreign substance variable, and includes, as an output variable, an abnormal site variable. The calculation process is a process for calculating, by the execution device, a value of the abnormal site variable by inputting, to the mapping, the values of the input variables acquired through the acquisition process. The reporting process is a process for reporting, by the execution device, a calculation result of the calculation process by operating a reporting device.

16 Claims, 12 Drawing Sheets

(51) Int. Cl.
    *F16H 61/68*     (2006.01)
    *F16H 59/72*     (2006.01)
    *F16H 59/42*     (2006.01)

(52) U.S. Cl.
    CPC ............. *F16H 59/72* (2013.01); *F16H 61/68* (2013.01); *F16H 2061/128* (2013.01); *F16H 2061/1268* (2013.01)

(56) References Cited

U.S. PATENT DOCUMENTS

| | | | |
|---|---|---|---|
| 2017/0082188 A1* | 3/2017 | McKimpson | F16H 57/01 |
| 2019/0227579 A1* | 7/2019 | Ishii | F16K 29/00 |
| 2020/0325657 A1* | 10/2020 | Takami | G05B 23/0259 |

* cited by examiner

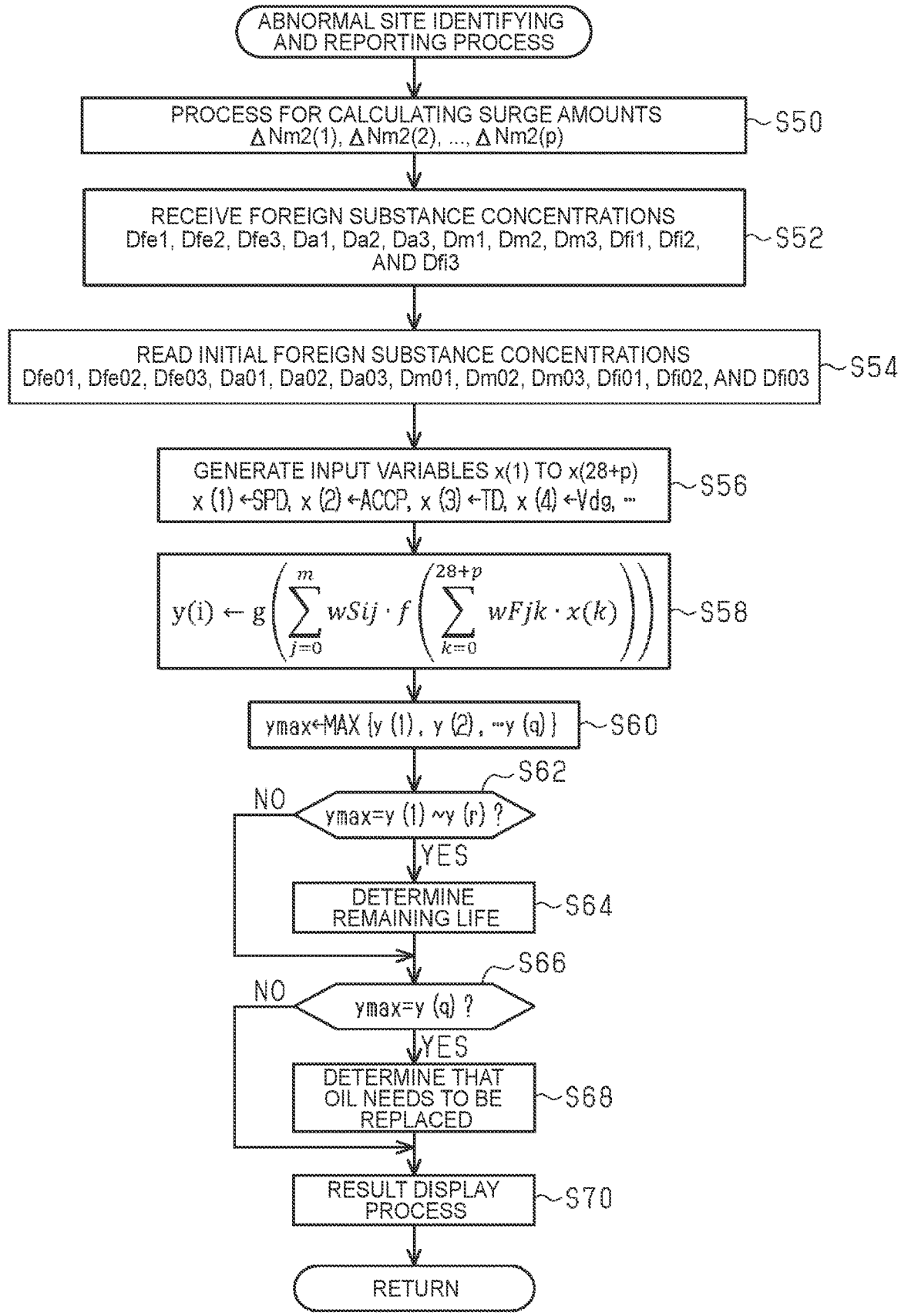

| y (1) | ABNORMALITY OF C1 |
| y (2) | ABNORMALITY OF C2 |
| ⋮ | |
| y (r+1) | ABNORMALITY OF FIRST SOLENOID VALVE |
| y (r+2) | ABNORMALITY OF SECOND SOLENOID VALVE |
| ⋮ | |
| y (q) | OIL REPLACEMENT DETERMINATION |
| y (q+1) | REMAINING LIFE OF C1 |
| y (q+2) | REMAINING LIFE OF C2 |
| ⋮ | | ional Patent Application
ON-BOARD COMPONENT ABNORMAL SITE IDENTIFYING METHOD, ON-BOARD COMPONENT ABNORMAL SITE IDENTIFYING SYSTEM, ON-BOARD COMPONENT ABNORMAL SITE IDENTIFYING APPARATUS, ON-BOARD COMPONENT ABNORMAL SITE REPORT CONTROL APPARATUS, AND VEHICLE CONTROL APPARATUS

CROSS-REFERENCE TO RELATED APPLICATION

This application claims priority to Japanese Patent Application No. 2020-087962 filed on May 20, 2020, incorporated herein by reference in its entirety.

BACKGROUND

1. Technical Field

The present disclosure relates to an on-board component abnormal site identifying method, an on-board component abnormal site identifying system, an on-board component abnormal site identifying apparatus, an on-board component abnormal site report control apparatus, and a vehicle control apparatus.

2. Description of Related Art

For example, Japanese Unexamined Patent Application Publication No. 2000-240784 (JP 2000-240784 A) describes an apparatus configured to detect a malfunction in a solenoid valve of a transmission based on a change in a rotation speed of an internal combustion engine during gear shifting.

SUMMARY

The site where an abnormality may occur in the transmission is not always the solenoid valve. Thus, it is difficult for the apparatus described above to identify an abnormal site when an abnormality occurs in the transmission.

An on-board component abnormal site identifying method according to a first aspect of the present disclosure includes executing an acquisition process, a calculation process, and a reporting process by an execution device. The acquisition process is a process for acquiring, by the execution device, values of input variables in a state in which mapping data for defining mapping is stored in a storage device. The mapping includes, as the input variables, a foreign substance variable related to a foreign substance in oil flowing through an on-board component when an abnormality occurs in the on-board component, and includes, as an output variable, an abnormal site variable indicating an abnormal site of the on-board component. The calculation process is a process for calculating, by the execution device, a value of the abnormal site variable by inputting, to the mapping, the values of the input variables that are acquired through the acquisition process. The reporting process is a process for reporting, by the execution device, a calculation result of the calculation process by operating a reporting device.

The foreign substance in the oil is a part of a plurality of possible causes of the abnormality of the on-board component where the oil flows. In the on-board component abnormal site identifying method according to the first aspect of the present disclosure, the value of the abnormal site variable is calculated based on the value of the variable related to the foreign substance in the oil. Therefore, the abnormal site can be identified based on the information indicating the abnormality in the oil. Thus, the abnormal site is easily identified as compared to a case where the value of that variable is not used.

In the on-board component abnormal site identifying method according to the first aspect of the present disclosure, the foreign substance variable may include variables indicating concentrations for individual types of the foreign substance in the flowing oil. Even at the same concentration of the foreign substance in the oil, the type of the abnormality of the on-board component where the oil flows or the likelihood of the abnormality varies depending on the type of the foreign substance. In the on-board component abnormal site identifying method according to the first aspect of the present disclosure, the accuracy of identification of the abnormal site can be increased by using the variables indicating concentrations for individual types of the foreign substance, as compared to a case where the variables are not used.

In the on-board component abnormal site identifying method according to the first aspect of the present disclosure, the foreign substance variable may include variables indicating concentrations for individual sizes of the foreign substance in the flowing oil. Even at the same concentration of the foreign substance in the oil, the type of the abnormality of the on-board component where the oil flows or the likelihood of the abnormality varies depending on the size of the foreign substance. In the on-board component abnormal site identifying method according to the first aspect of the present disclosure, the accuracy of identification of the abnormal site can be increased by using the variables indicating concentrations for individual sizes of the foreign substance, as compared to a case where the variables are not used.

In the on-board component abnormal site identifying method according to the first aspect of the present disclosure, the foreign substance variable may be a variable indicating a color of the flowing oil. When the foreign substance is in the oil, the color of the oil may vary depending on the concentration or type of the foreign substance. In the on-board component abnormal site identifying method according to the first aspect of the present disclosure, the input variables of the mapping can include the variable related to the foreign substance by using the variable indicating the color of the oil.

In the on-board component abnormal site identifying method according to the first aspect of the present disclosure, the input variables may include a traveling distance variable correlated to a total traveling distance of a vehicle where the on-board component is mounted. The color of the oil flowing through the on-board component changes as the period of use of the on-board component increases. In a normal condition, the color is roughly determined based on the period of use. Therefore, when the color of the oil is a typical color over a long period of use, there is a strong possibility of the abnormality in the oil. In the on-board component abnormal site identifying method according to the first aspect of the present disclosure, the abnormal site can be identified with higher accuracy by using the variable related to the color and the traveling distance variable, as compared to a case where those variables are not used.

In the on-board component abnormal site identifying method according to the first aspect of the present disclosure, the acquisition process may include a process for acquiring, as the foreign substance variable, a variable obtained by correcting a variable indicating a color of the flowing oil to a denser side when a driving load is large than a case where the driving load is small. The driving load may be a driving load in a driving record of a vehicle including the on-board component.

When the foreign substance is in the oil, the color of the oil may vary depending on the concentration or type of the foreign substance. Therefore, the input variables of the mapping can include the variable related to the foreign substance by using the variable indicating the color of the oil. The color of the oil flowing through the on-board component changes as the period of use of the on-board component increases. In a normal condition, the color is roughly determined based on the period of use. Therefore, when the color of the oil is a typical color over a long period of use, there is a strong possibility of the abnormality in the oil. One of the reasons why the color of the oil is a typical color over a long period of use is that the traveling load is excessively large. In the on-board component abnormal site identifying method according to the first aspect of the present disclosure, the input variables include the variable corrected to a denser side when the load in the traveling record of the vehicle is large than the case where the load is small. For example, even if the finding that the possibility of the abnormality in the oil is strong when the color of the oil is a typical color over a long period of use is not reflected in the mapping, the value of the output variable of the mapping can be based on the finding.

In the on-board component abnormal site identifying method according to the first aspect of the present disclosure, the on-board component may include a rotating machine and a stepped transmission. The input variables may include a deviation amount variable indicating a deviation amount between a reference rotation speed and an actual rotation speed of a rotational shaft of the rotating machine when a gear ratio is changed by the stepped transmission.

When the abnormality occurs in the stepped transmission, there is a tendency toward an increase in the deviation between the reference rotation speed and the actual rotation speed of the rotational shaft of the rotating machine when the gear ratio is changed. In the on-board component abnormal site identifying method according to the first aspect of the present disclosure, the value of the abnormal site variable can be calculated with higher accuracy by using the deviation amount variable as the input variable.

In the on-board component abnormal site identifying method according to the first aspect of the present disclosure, the acquisition process may include a process for acquiring, as the deviation amount variable, time-series data of variables indicating the deviation amount at a plurality of timings when the gear ratio is changed.

In the on-board component abnormal site identifying method according to the first aspect of the present disclosure, the value of the abnormal site variable is calculated based on the time-series data of variables indicating the deviation amount. Therefore, the value of the abnormal site variable can be calculated based on more detailed information as compared to a case where the value of the abnormal site variable is calculated based on a single variable indicating the deviation amount alone. Thus, the value of the abnormal site variable can be calculated with higher accuracy as compared to the case where the value of the abnormal site variable is calculated based on a single variable indicating the deviation amount alone.

In the on-board component abnormal site identifying method according to the first aspect of the present disclosure, candidates for the abnormal site indicated by the abnormal site variable may include a solenoid valve of the stepped transmission and a friction engagement element of the stepped transmission.

In the case where the deviation between the reference rotation speed and the actual rotation speed of the rotational shaft of the rotating machine increases when the gear ratio is changed, it is difficult to determine, based on behavior of the rotation speed alone, whether the cause of the increase in the deviation is the solenoid valve or the friction engagement element. The abnormality of the solenoid valve is mainly caused by the foreign substance in the oil. In the on-board component abnormal site identifying method according to the first aspect of the present disclosure, the value of the abnormal site variable can be calculated with higher accuracy by using the variable related to the foreign substance in the oil in combination, as compared to a case where the value of the abnormal site variable is calculated without using the variable related to the foreign substance.

In the on-board component abnormal site identifying method according to the first aspect of the present disclosure, the mapping may include, as the output variable, a remaining life variable in addition to the abnormal site variable. The remaining life variable indicates information as to whether a component corresponding to the abnormal site is still usable. The calculation process may include a process for calculating a value of the remaining life variable in addition to the abnormal site variable.

When the abnormal site is identified, information may be obtained as to whether the component corresponding to the abnormal site is still usable. In the on-board component abnormal site identifying method according to the first aspect of the present disclosure, the value of the remaining life variable can be calculated based on the values of the input variables.

In the on-board component abnormal site identifying method according to the first aspect of the present disclosure, the execution device may be configured to make determination as to whether the abnormality occurs in the on-board component, and execute the calculation process when determining that the abnormality occurs in the on-board component. The mapping may include, as the input variables, a diagnosis variable indicating a range in which the abnormality occurs through the determination. The acquisition process may include a process for acquiring a value of the diagnosis variable serving as one of the input variables.

In the on-board component abnormal site identifying method according to the first aspect of the present disclosure, the input variables include the value of the diagnosis variable. Therefore, the value of the output variable can be calculated based on information related to the abnormal site in the range in which the abnormal site can be identified through the determination. Thus, it is possible to reduce the number of pieces of training data to be used for training the mapping data and calculate the value of the output variable with high accuracy even in fewer intermediate layers and fewer dimensions of the input variables as compared to a case where the input variables do not include the diagnosis variable.

In the on-board component abnormal site identifying method according to the first aspect of the present disclosure, the on-board component may include a rotating machine and a stepped transmission. The input variables may include a deviation amount variable indicating a deviation amount between a reference rotation speed and an actual rotation speed of a rotational shaft of the rotating machine when a gear ratio is changed by the stepped transmission. A vehicle where the on-board component is mounted may be configured to execute a speed transmission process for transmitting speed variables indicating the rotation speed to an outside of the vehicle, a determination process for determining whether the abnormality occurs in the stepped transmission, and a result transmission process for transmitting a determination result when determining that the abnormality occurs through the determination process. The execution device may be configured to execute a reception process for receiving the determination result. The acquisition process may include a process for acquiring a value of the deviation amount variable based on selection of a speed variable associated with the determination result from among the speed variables transmitted through the speed transmission process.

In the on-board component abnormal site identifying method according to the first aspect of the present disclosure, the deviation amount variable can be acquired by selectively using the speed variable associated with the timing when the abnormality occurs among the speed variables transmitted from the vehicle. An on-board component abnormal site identifying system according to a second aspect of the present disclosure includes the execution device, the storage device, the reporting device, and the vehicle in the on-board component abnormal site identifying method according to the first aspect of the present disclosure.

An on-board component abnormal site identifying apparatus according to a third aspect of the present disclosure includes the execution device in the on-board component abnormal site identifying system according to the second aspect of the present disclosure. The execution device includes one or more execution devices. At least one of the one or more execution devices is configured to execute the calculation process.

An on-board component abnormal site report control apparatus according to a fourth aspect of the present disclosure includes the execution device in the on-board component abnormal site identifying system according to the second aspect of the present disclosure. The execution device includes one or more execution devices. At least one of the one or more execution devices is configured to execute the reporting process.

In the on-board component abnormal site report control apparatus according to the fourth aspect of the present disclosure, the abnormal site can be reported. A vehicle control apparatus according to a fifth aspect of the present disclosure includes a processor configured to execute the speed transmission process, the determination process, and the result transmission process in the on-board component abnormal site identifying system according to the second aspect of the present disclosure.

In the vehicle control apparatus according to the fifth aspect of the present disclosure, when the abnormality occurs in the vehicle that provides the values of the speed variables as big data, the provided data can be used for identifying the abnormal site.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart illustrating details of a process to be executed by a manufacturer apparatus according to the first embodiment;

DETAILED DESCRIPTION OF EMBODIMENTS

First Embodiment

An on-board component abnormal site identifying method according to a first embodiment is described below with reference to the drawings.

Figure 1:
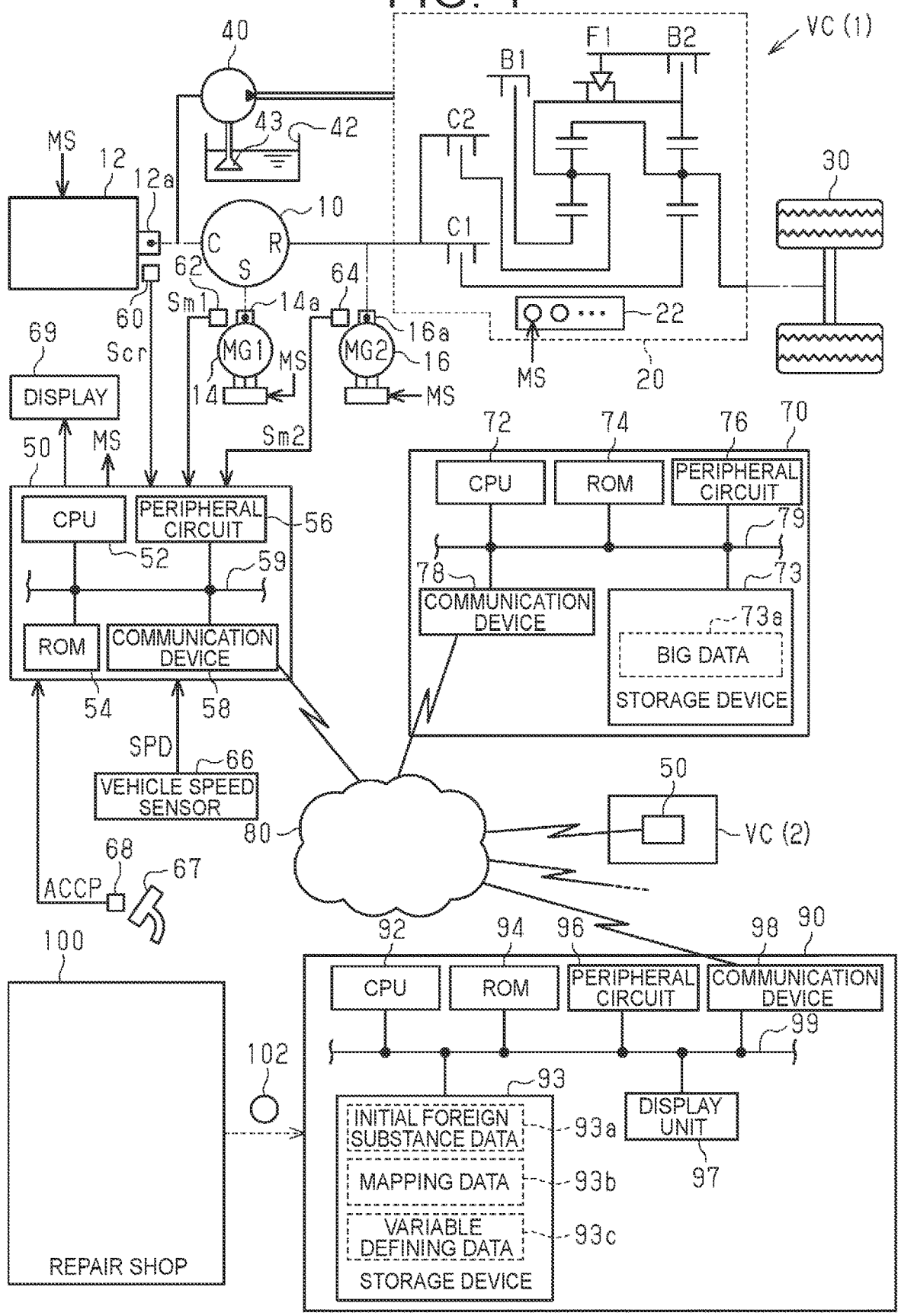
FIG. 1 is a diagram illustrating the configuration of an on-board component abnormal site identifying system according to a first embodiment.

A vehicle VC(1) illustrated in FIG. 1 is a series-parallel hybrid vehicle. A power split device 10 of the vehicle VC(1) includes a planetary gearing mechanism including a sun gear S, a carrier C, and a ring gear R. A crankshaft 12a of an internal combustion engine 12 is mechanically coupled to the carrier C of the power split device 10. A rotational shaft 14a of a first motor generator 14 is mechanically coupled to the sun gear S. A rotational shaft 16a of a second motor generator 16 is mechanically coupled to the ring gear R. Driving wheels 30 are mechanically coupled to the ring gear R via a stepped transmission 20 including clutches C1 and C2, brakes B1 and B2, and a one-way clutch F1.

The transmission 20 is supplied with hydraulic oil ejected from an oil pump 40 having a driven shaft mechanically coupled to the carrier C of the power split device 10. The oil pump 40 sucks oil in an oil pan 42 via a strainer 43, and ejects the oil to the transmission 20.

A control apparatus 50 controls the vehicle, and controls control amounts such as a torque and an exhaust gas component ratio of the internal combustion engine 12, a torque of the first motor generator 14, and a torque of the second motor generator 16. The control apparatus 50 operates the transmission 20 to change a gear ratio as a control amount. At this time, the control apparatus 50 operates solenoid valves 22 of the transmission 20 to control a line pressure that is a pressure of the hydraulic oil in the transmission 20. The control apparatus 50 may be regarded as a vehicle control apparatus.

To control the control amounts, the control apparatus 50 refers to an output signal Scr from a crank angle sensor 60, an output signal Sm1 from a first rotation angle sensor 62, and an output signal Sm2 from a second rotation angle sensor 64. The first rotation angle sensor 62 detects a rotation angle of the rotational shaft 14a of the first motor generator 14. The second rotation angle sensor 64 detects a rotation angle of the rotational shaft 16a of the second motor generator 16. The control apparatus 50 also refers to a vehicle speed SPD detected by a vehicle speed sensor 66, and an accelerator operation amount ACCP that is an amount of depression of an accelerator pedal 67 detected by an accelerator sensor 68.

The control apparatus 50 includes a central processing unit (CPU) 52, a read-only memory (ROM) 54, a peripheral circuit 56, and a communication device 58, which are communicable with each other via a local network 59. The peripheral circuit 56 includes a circuit configured to generate a clock signal for defining internal operations, a power supply circuit, and a reset circuit. The CPU 52 serving as a processor executes programs stored in the ROM 54, whereby the control apparatus 50 controls the control amounts.

Figure 2:
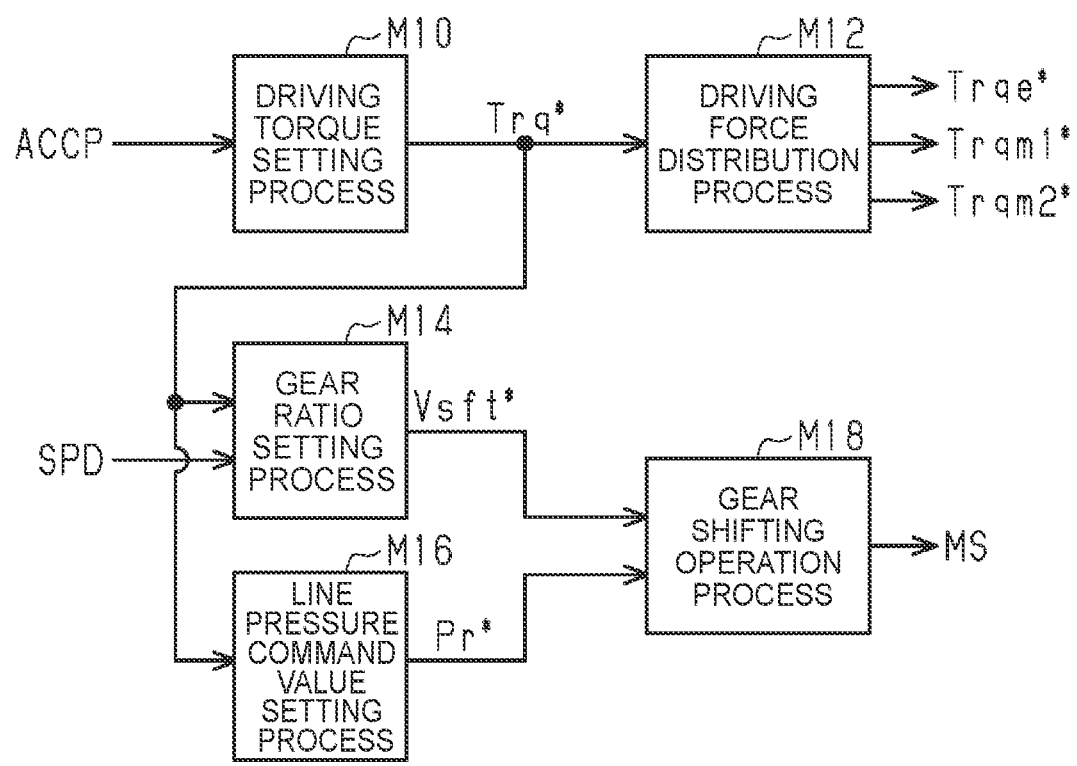
FIG. 2 is a block diagram illustrating processes to be executed by a control apparatus according to the first embodiment.

FIG. 2 illustrates a part of processes to be executed by the control apparatus 50. The CPU 52 repeatedly executes the programs stored in the ROM 54 in, for example, every predetermined period, whereby the processes illustrated in FIG. 2 are implemented.

In a driving torque setting process M10, the accelerator operation amount ACCP is input. When the accelerator operation amount ACCP is large, a driving torque command value Trq* is calculated as a larger value than the value when the accelerator operation amount ACCP is small. The driving torque command value Trq* is a command value of a torque to be applied to the driving wheels 30.

In a driving force distribution process M12, a torque command value Trqe* for the internal combustion engine 12, a torque command value Trqm1* for the first motor generator 14, and a torque command value Trqm2* for the second motor generator 16 are set based on the driving torque command value Trq. The torque command values Trqe, Trqm1*, and Trqm2* are values at which the torque to be generated by the internal combustion engine 12, the first motor generator 14, and the second motor generator 16 and applied to the driving wheels 30 follows the driving torque command value Trq.

In a gear ratio setting process M14, a gear ratio command value Vsft* is set based on the vehicle speed SPD and the driving torque command value Trq*. The gear ratio command value Vsft* is a command value of a gear ratio of the transmission 20. In a line pressure command value setting process M16, a line pressure command value Pr* is set based on the driving torque command value Trq*. The line pressure command value Pr* is a command value of the pressure of the oil in the transmission 20. Specifically, when the driving torque command value Trq* is large, the line pressure command value Pr* is set to a larger value than the value when the driving torque command value Trq* is small.

In a gear shifting operation process M18, an operation signal MS is output to the transmission 20 to control the pressure of the oil at the line pressure command value Pr* or control the gear ratio at the gear ratio command value Vsft*. The oil is used to hydraulically drive friction engagement elements such as clutches and brakes in the transmission 20 based on the line pressure command value Pr*.

Referring back to FIG. 1, the control apparatus 50 is communicable with a data center 70 via a global network 80 by operating the communication device 58. The data center 70 includes a CPU 72, a storage device 73, a ROM 74, a peripheral circuit 76, and a communication device 78, which are communicable with each other via a local network 79. The storage device 73 is an electrically rewritable non-volatile device. The storage device 73 stores data transmitted from a plurality of vehicles VC(1), VC(2), . . . as big data 73a. The big data 73a includes data transmitted from vehicles having different specifications. For convenience, the vehicles VC(1), VC(2), . . . are hereinafter assumed as vehicles having the same specifications.

A manufacturer apparatus 90 is provided in a vehicle manufacturer of the vehicles VC(1), VC(2), . . . . The manufacturer apparatus 90 includes a CPU 92, a storage device 93, a ROM 94, a peripheral circuit 96, a display unit 97, and a communication device 98, which are communicable with each other via a local network 99. The storage device 93 is an electrically rewritable non-volatile device. The CPU 92 and the ROM 94 may be regarded as an execution device. The storage device 93 may be regarded as a storage device. The display unit 97 may be regarded as a reporting device.

A repair shop 100 is located at a place nearest to a user who brings the vehicle VC(1) when an abnormality occurs in the vehicle VC(1). The system illustrated in FIG. 1 is configured such that, when an abnormality occurs in the transmission 20, the cause of the abnormality is identified. This system is described below in detail.

Figure 3:
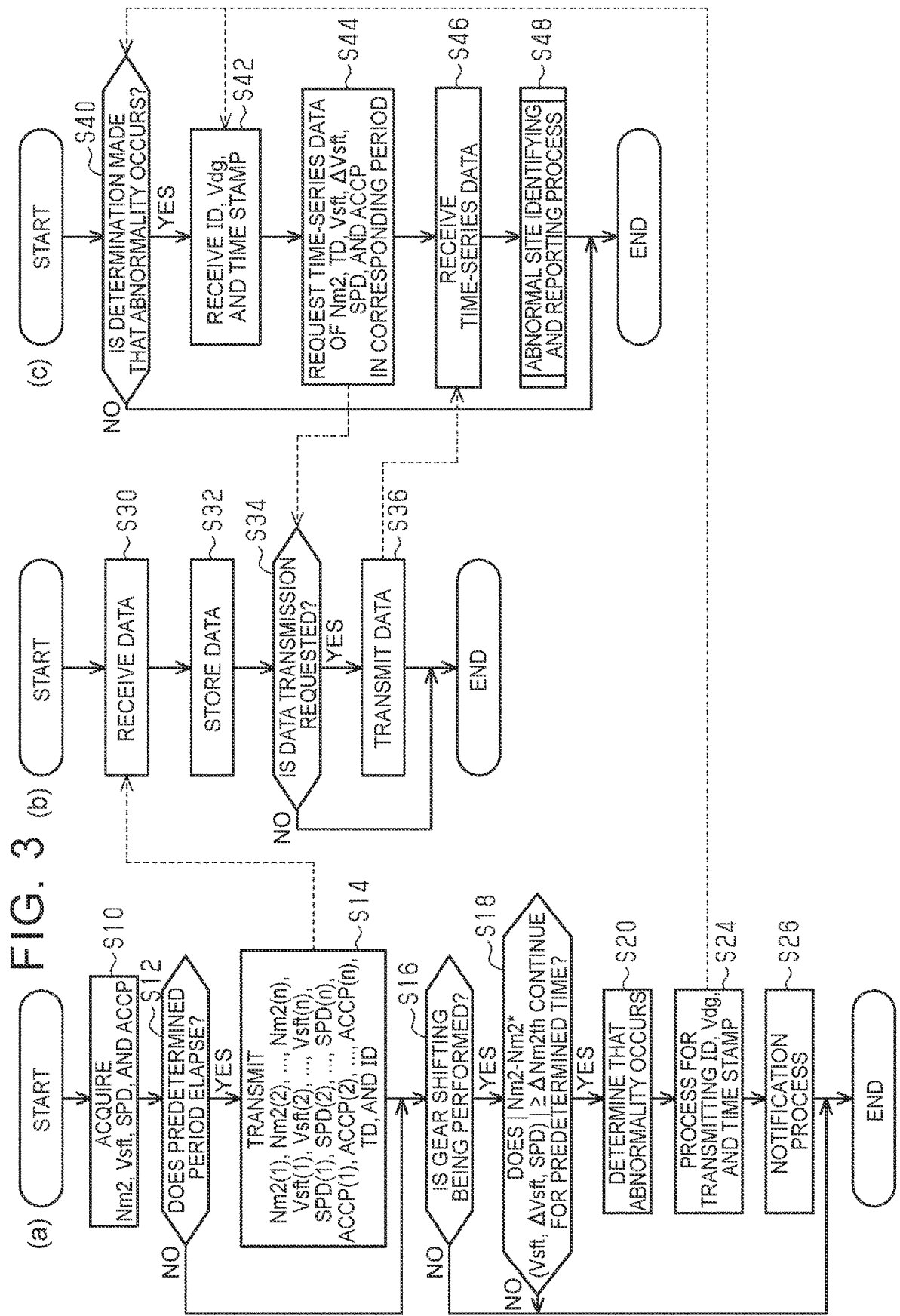
FIG. 3 is a flowchart illustrating a procedure of processes to be executed by the system.

FIG. 3 illustrates a procedure of processes related to the abnormality. Specifically, the CPU 52 of the control apparatus 50 repeatedly executes a program stored in the ROM 54 in, for example, every predetermined period, whereby the process illustrated in Part (a) of FIG. 3 is implemented. The CPU 72 of the data center 70 repeatedly executes a program stored in the ROM 74 in, for example, every predetermined period, whereby the process illustrated in Part (b) of FIG. 3 is implemented. The CPU 92 of the manufacturer apparatus 90 repeatedly executes a program stored in the ROM 94 in, for example, every predetermined period, whereby the process illustrated in Part (c) of FIG. 3 is implemented. Step numbers of each process are hereinafter represented by numerals prefixed with "S". The processes illustrated in FIG. 3 are described below along the time sequence of the processes related to the abnormality.

In a series of processes illustrated in Part (a) of FIG. 3, the CPU 52 first acquires a rotation speed Nm2 of the rotational shaft 16a of the second motor generator 16, a gear ratio Vsft, a vehicle speed SPD, and an accelerator operation amount ACCP (S10). The rotation speed Nm2 is calculated by the CPU 52 based on the output signal Sm2. Next, the CPU 52 determines whether a predetermined period elapses from execution of a process of S14 described later (S12). When the CPU 52 determines that the predetermined period elapses (S12: YES), the CPU 52 operates the communication device 58 to transmit, together with an identification code ID and a traveling distance TD of the vehicle VC(1), values of the variables acquired every time through the process of S10 in the predetermined period (S14). In Part (a) of FIG. 3, "n" represents a sampling count of the rotation speed Nm2 or the like in the predetermined period. The traveling distance TD may be regarded as a traveling distance variable. The rotation speed Nm2 may be regarded as a speed variable. The process of S14 may be regarded as a speed transmission process.

As illustrated in Part (b) of FIG. 3, the CPU 72 of the data center 70 receives the data transmitted through the process of S14 (S30). The CPU 72 stores the received data in the storage device 73 as big data 73a (S32).

As illustrated in Part (a) of FIG. 3, when the process of S14 is completed or when the determination result in the process of S12 is negative, the CPU 52 determines whether gear shifting is being performed to change the gear ratio by the transmission 20 (S16). When the CPU 52 determines that the gear shifting is being performed (S16: YES), the CPU 52 determines whether an absolute value of a difference between the rotation speed Nm2 acquired through the process of S10 and a reference rotation speed Nm2* continues to be equal to or larger than a threshold ΔNm2th for a predetermined time or longer (S18). This process is a process for determining whether an abnormality occurs in gear shifting control. The process of S18 may be regarded as a determination process.

Figure 4:
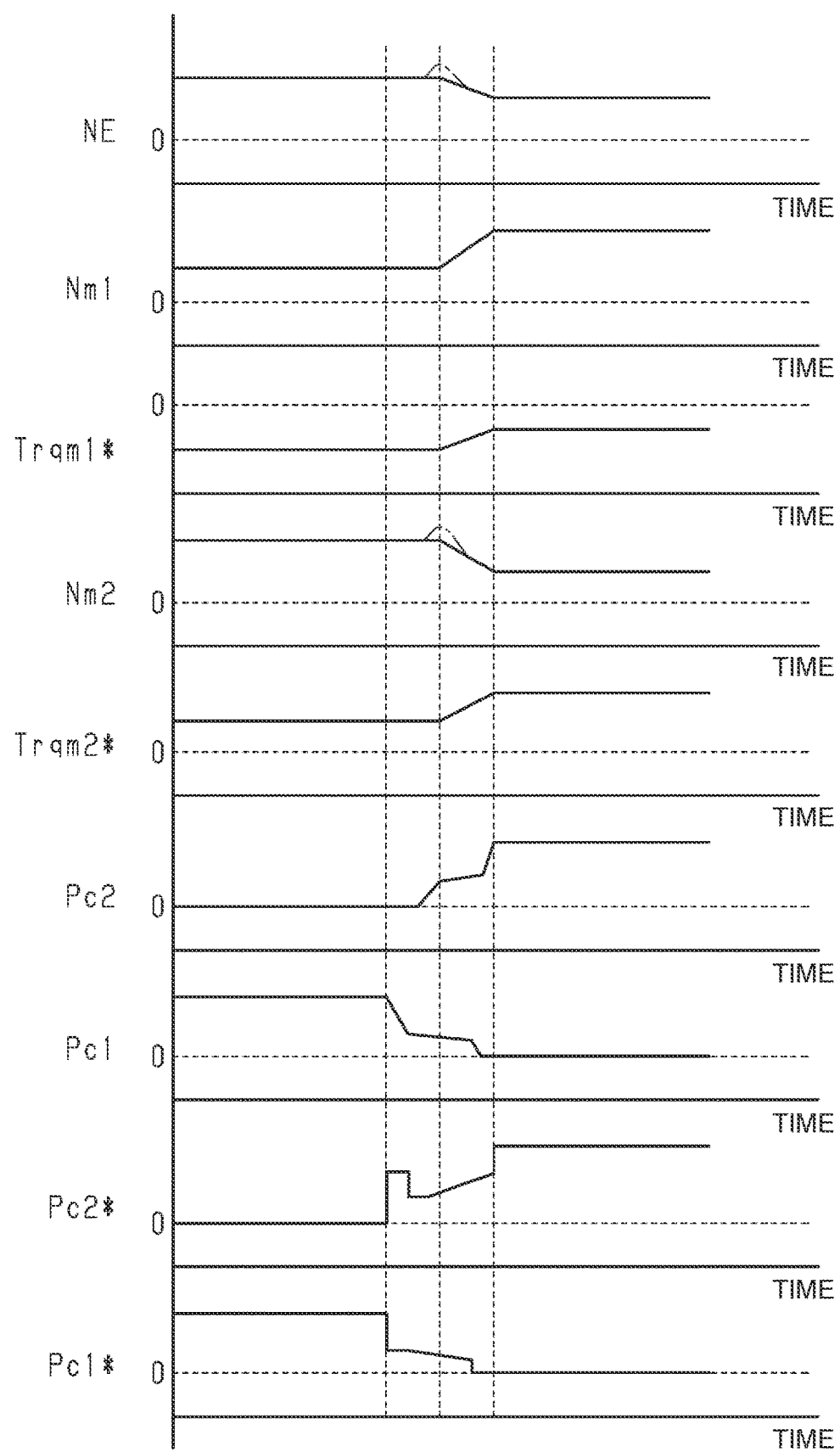
FIG. 4 is a time chart illustrating a surge amount according to the first embodiment.

That is, when an abnormality occurs in the gear shifting control, rotation speeds on an input side of the transmission 20 surge. Therefore, a rotation speed NE of the crankshaft 12a and the rotation speed Nm2 of the rotational shaft 16a of the second motor generator 16 surge as indicated by long dashed short dashed lines in FIG. 4. FIG. 4 illustrates changes in the rotation speeds NE, Nm1, and Nm2 and the torque command values Trqm1* and Trqm2*, and also illustrates changes in a hydraulic pressure Pc2 of an engagement-side friction engagement element expected in the gear shifting in FIG. 4, a hydraulic pressure Pc1 of a disengagement-side friction engagement element expected in the gear shifting, and command values Pc2* and Pc1* of those hydraulic pressures. The line pressure command value Pr* described above is a target value of the engagement-side hydraulic pressure Pc2 when the friction engagement element is engaged.

The command values Pc2* and Pc1* are set to reduce the occurrence of, for example, the surge in the rotation speeds on the input side of the transmission 20. With this setting, the reference rotation speed Nm2* during the gear shifting is determined. The CPU 52 sets the reference rotation speed Nm2* by inputting a current gear ratio Vsft, a variable ΔVsft, and a vehicle speed SPD. The variable ΔVsft indicates a high-speed side or a low-speed side from which the gear shifting is performed. This process can be implemented through map calculation of the rotation speed Nm2* by the CPU 52 in a state in which the ROM 54 prestores map data in which the gear ratio Vsft, the variable ΔVsft, and the vehicle speed SPD are input variables and the rotation speed Nm2* is an output variable. The map data is a data set including discrete values of the input variables and values of the output variable associated with the individual values of the input variables. The map calculation may be performed in the following process. For example, when the values of the input variables match any values of the input variables in the map data, an associated value of the output variable in the map data is output as a calculation result. When the values of the input variables have no match, a value interpolated between a plurality of values of the output variable in the map data is output as a calculation result.

Referring back to FIG. 3, when the CPU 52 determines that the absolute value continues to be equal to or larger than the threshold ΔNm2th for the predetermined time (S18: YES), the CPU 52 determines that the transmission 20 has an abnormality (S20). Next, the CPU 52 operates the communication device 58 to transmit the identification code ID of the vehicle VC(1), a diagnosis variable Vdg indicating the abnormality determination result, and a time stamp for identifying a time when the abnormality occurs (S24). The diagnosis variable Vdg indicates a type of the abnormality. For example, when the determination result in the process of S18 is positive during gear shifting from second gear to third gear, the diagnosis variable Vdg indicates that the type of the abnormality is an abnormality occurring during the gear shifting from second gear to third gear. The diagnosis variable Vdg has information for narrowing down a site of the abnormality as far as the site can be identified through the process of S18. That is, when the diagnosis variable Vdg indicates the abnormality occurring during the gear shifting from second gear to third gear, the abnormal site may be, for example, a friction engagement element switched from one of the disengaged state and the engaged state to the other during the gear shifting from second gear to third gear, or a solenoid valve that drives the friction engagement element. The process of S24 may be regarded as a result transmission process.

The CPU 52 executes a notification process for notifying the user of the abnormality by operating a display 69 illustrated in FIG. 1 to display visual information indicating that the abnormality occurs (S26). When the process of S26 is completed or when the determination result in the process of S16 or S18 is negative, the CPU 52 temporarily terminates the series of processes illustrated in Part (a) of FIG. 3.

As illustrated in Part (c) of FIG. 3, the CPU 92 of the manufacturer apparatus 90 determines whether data related to the abnormality determination is transmitted (S40). When the CPU 92 determines that the data related to the abnormality determination is transmitted (S40: YES), the CPU 92 receives the diagnosis variable Vdg and the time stamp together with the identification code ID of the vehicle VC(1) (S42). Next, the CPU 92 operates the communication device 98 to request the data center 70 for time-series data of rotation speeds Nm2, the traveling distance TD, the gear ratio Vsft, the variable ΔVsft, and the vehicle speed SPD associated with the time when the abnormality occurs in the vehicle identified by the received identification code ID (S44). The process of S42 may be regarded as a reception process.

As illustrated in Part (b) of FIG. 3, the CPU 72 of the data center 70 determines whether data transmission is requested (S34). When the CPU 72 determines that the request is made (S34: YES), the CPU 72 extracts corresponding data from the big data 73a stored in the storage device 73, and transmits the data by operating the communication device 78 (S36). When the process of S36 is completed or when the determination result in the process of S34 is negative, the CPU 72 temporarily terminates the series of processes illustrated in Part (b) of FIG. 3.

As illustrated in Part (c) of FIG. 3, the CPU 92 receives the time-series data transmitted through the process of S36 (S46). The CPU 92 executes a process for identifying the abnormal site and reporting an identification result (S48). When the process of S48 is completed or when the determination result in the process of S40 is negative, the CPU 92 temporarily terminates the series of processes illustrated in Part (c) of FIG. 3.

FIG. 5 illustrates details of the process of S48. In a series of processes illustrated in FIG. 5, the CPU 92 first calculates, based on the time-series data of rotation speeds Nm2 received through the process of S46, surge amounts $\Delta$Nm2 (1), $\Delta$Nm2(2), . . . that are values obtained by subtracting the reference rotation speed Nm2* from the rotation speeds Nm2 in the gear shifting period (S50). In this embodiment, the gear shifting period is a predetermined period determined based on a timing when a gear shifting command is issued. Each parenthesized numeral is a sampling number of the surge amount $\Delta$Nm2. As the number increases, the surge amount is sampled at a later time. In FIG. 5, the sampling count of the surge amount $\Delta$Nm2 is "p". The surge amount $\Delta$Nm2 is a variable that may take different values between an abnormal state and a normal state. The time-series data of surge amounts $\Delta$Nm2 in the process of S50 may be regarded as a deviation amount variable.

Figure 6A:
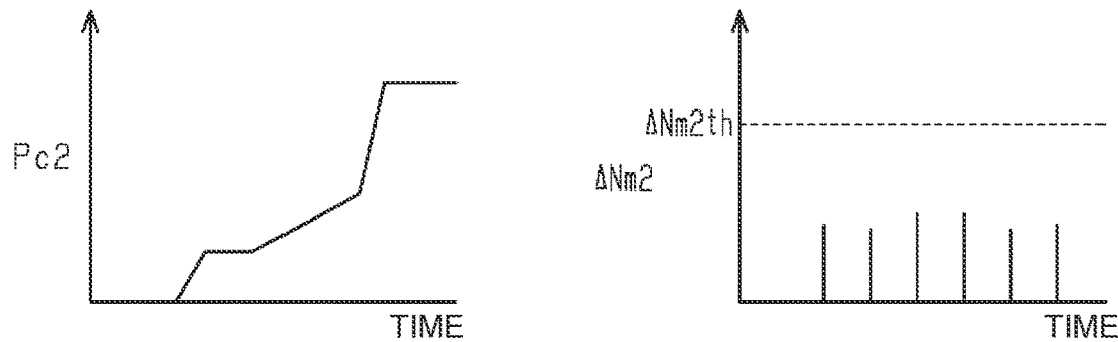
FIG. 6A is a time chart illustrating a relationship between behavior of a rotation speed during gear shifting and a cause of an abnormality according to the first embodiment.
Figure 6B:
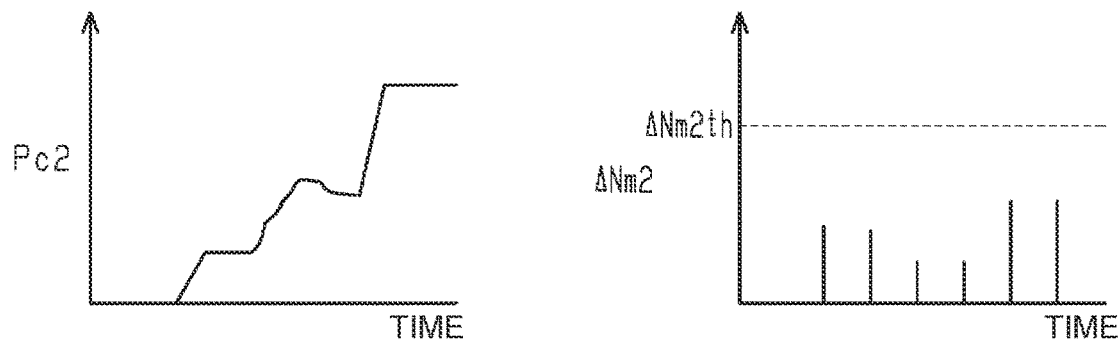
FIG. 6B is a time chart illustrating a relationship between the behavior of the rotation speed during the gear shifting and the cause of the abnormality according to the first embodiment.
Figure 6C:
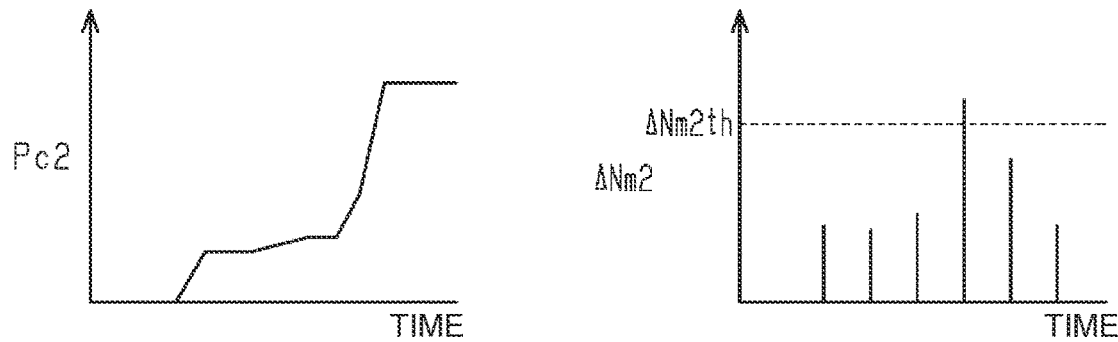
FIG. 6C is a time chart illustrating a relationship between the behavior of the rotation speed during the gear shifting and the cause of the abnormality according to the first embodiment.
Figure 6D:
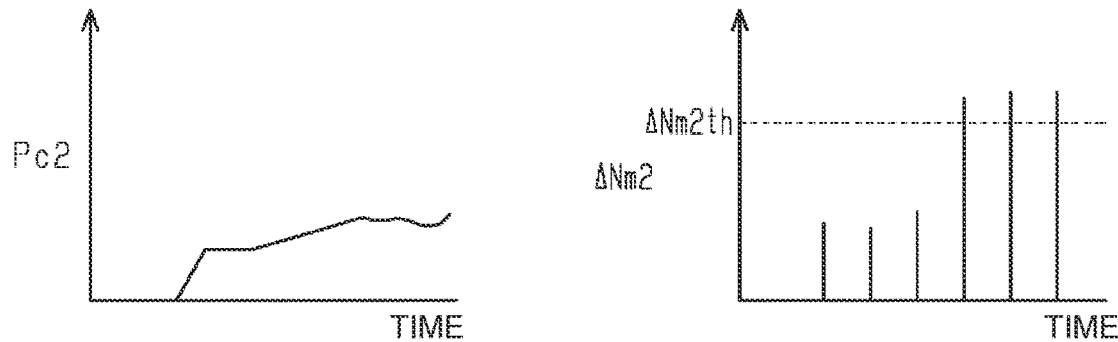
FIG. 6D is a time chart illustrating a relationship between the behavior of the rotation speed during the gear shifting and the cause of the abnormality according to the first embodiment.

FIG. 6A to FIG. 6D illustrate changes in the hydraulic pressure Pc2 and the rotation speed Nm2 during gear shifting. FIG. 6A to FIG. 6D each illustrate six sampled values of the rotation speed Nm2. FIG. 6A illustrates an example of changes in the normal state. FIG. 6B to FIG. 6D illustrate examples of changes in the abnormal state.

Specifically, FIG. 6B illustrates an example in which the rotation speed Nm2 exhibits behavior different from that in the normal state because air enters the solenoid valve 22 and an abnormality occurs in the control for the hydraulic pressure Pc2 through feedback control. FIG. 6C illustrates a case where a foreign substance enters the solenoid valve 22 and the valve fails to operate temporarily. In this case, the surge amount $\Delta$Nm2 temporarily exceeds the threshold $\Delta$Nm2th due to a temporary slowdown of an increase in the hydraulic pressure Pc2. FIG. 6D illustrates a case where a foreign substance enters the solenoid valve 22 and the valve fails to operate constantly. In this case, the friction engagement element cannot be engaged because the hydraulic pressure Pc2 is low, and the surge amount $\Delta$Nm2 continues to exceed the threshold $\Delta$Nm2th.

Referring back to FIG. 5, the CPU 92 acquires concentrations of impurities in the oil that fills the transmission 20 of the vehicle VC(1) having the abnormality (S52). In this embodiment, the concentrations of impurities in the oil are detected by a particle sensor at the vehicle manufacturer by providing a part of oil 102 that fills the transmission 20 of the vehicle VC(1) from the repair shop 100 illustrated in FIG. 1 to the vehicle manufacturer. That is, the user is notified of the abnormality through the process of S26 in Part (a) of FIG. 3, and brings the vehicle VC(1) to the repair shop 100. In the repair shop 100, a part of the oil 102 is sampled from the vehicle VC(1) and delivered to the vehicle manufacturer.

Figure 7A:
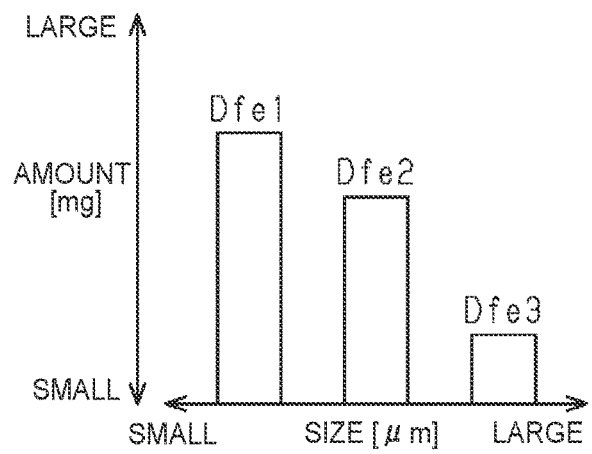
FIG. 7A is a diagram exemplifying a foreign substance variable according to the first embodiment.
Figure 7B:
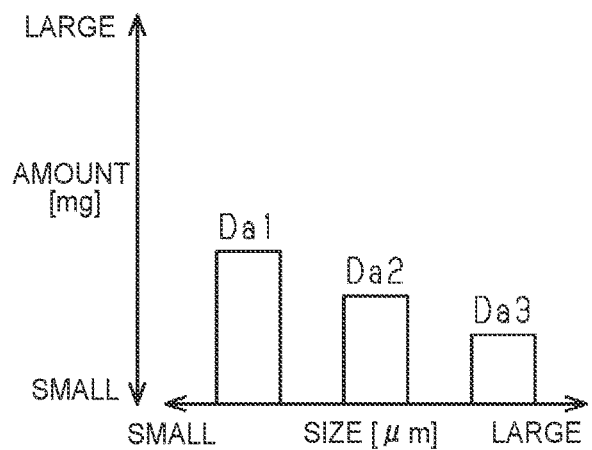
FIG. 7B is a diagram exemplifying the foreign substance variable according to the first embodiment.
Figure 7C:
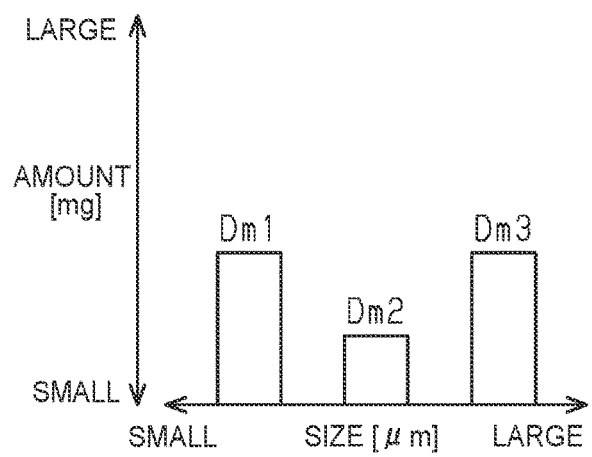
FIG. 7C is a diagram exemplifying the foreign substance variable according to the first embodiment.
Figure 7D:
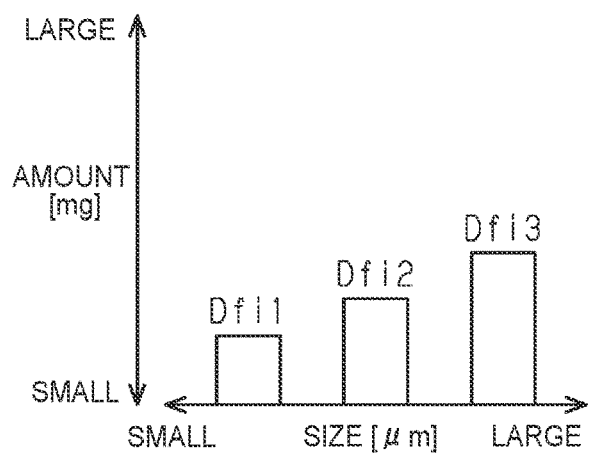
FIG. 7D is a diagram exemplifying the foreign substance variable according to the first embodiment.

In this embodiment, iron-based foreign substance concentrations Dfe1 to Dfe3 illustrated in FIG. 7A, aluminum-based foreign substance concentrations Da1 to Da3 illustrated in FIG. 7B, mineral-based foreign substance concentrations Dm1 to Dm3 illustrated in FIG. 7C, and fiber-based foreign substance concentrations Dfi1 to Dfi3 illustrated in FIG. 7D are quantified. That is, in this embodiment, the foreign substance concentration is quantified not only for each of four types of foreign substance, that is, iron-based, aluminum-based, mineral-based, and fiber-based foreign substances, but also for each of three classes of impurity size. The iron-based foreign substance concentrations Dfe1 to Dfe3, the aluminum-based foreign substance concentrations Da1 to Da3, the mineral-based foreign substance concentrations Dm1 to Dm3, and the fiber-based foreign substance concentrations Dfi1 to Dfi3 may be regarded as types of foreign substance. The classification of the concentration of, for example, the iron-based foreign substance into the three foreign substance concentrations Dfe1 to Dfe3 may be regarded as concentrations for individual sizes of the foreign substance.

Those concentrations are set to identify a cause of an abnormality and a remaining life of an abnormal site with high accuracy. According to the inventors' findings over the years, the cause of the abnormality and the remaining life of the abnormal site depend on the type of the foreign substance in the oil. For example, when the amount of a fiber-based foreign substance having a small particle size is excessively large, the remaining life of a component tends to decrease. Therefore, the remaining life and the like vary depending on the size of the foreign substance as well. The reason why the remaining life decreases when the amount of the fiber-based foreign substance having a small particle size is excessively large is presumably that a fiber-based foreign substance having a large particle size is filtrated by the strainer 43.

Referring back to FIG. 5, the CPU 92 acquires initial foreign substance concentrations that are concentrations of foreign substances in the oil at the time of shipment of the vehicle VC(1), in association with the current foreign substance concentrations in the oil that are acquired through the process of S52 (S54). The storage device 93 illustrated in FIG. 1 stores initial foreign substance data 93a containing initial iron-based foreign substance concentrations Dfe01 to Dfe03, initial aluminum-based foreign substance concentrations Da01 to Da03, initial mineral-based foreign substance concentrations Dm01 to Dm03, and initial fiber-based foreign substance concentrations Dfi01 to Dfi03. The CPU 92 acquires the initial foreign substance concentrations by accessing the storage device 93. The processes of S46 and S50 to S54 may be regarded as an acquisition process.

In this embodiment, the initial foreign substance data 93a is generated by sampling oil and detecting concentrations of foreign substances prior to shipping of some vehicles produced in the same period as that of the vehicle VC(1).

The CPU 92 substitutes the diagnosis variable Vdg acquired through the process of S42, the vehicle speed SPD, the accelerator operation amount ACCP, and the traveling distance TD acquired through the process of S46, and the values of the variables acquired through the processes of S50 to S54 for input variables x(1) to x(28+p) of mapping for identifying the abnormal site (S56). In FIG. 5, the CPU 92 substitutes the vehicle speed SPD for the input variable x(1), the accelerator operation amount ACCP for the input variable x(2), the traveling distance TD for the input variable x(3), and the diagnosis variable Vdg for the input variable x(4). Similarly, the CPU 92 substitutes, for example, the values of the 24 variables acquired through the processes of S52 and S54 for the input variables $x(5)$ to $x(28)$, and the surge amounts $\Delta Nm2(1)$, $\Delta Nm2(2)$, $\Delta Nm2(p)$ for the input variables $x(29)$ to $x(28+p)$.

The CPU 92 calculates a value of an output variable $y(i)$ by substituting the input variables $x(1)$ to $x(28+p)$ generated through the process of S56 and an input variable $x(0)$ serving as a bias parameter into mapping defined by mapping data 93b stored in the storage device 93 illustrated in FIG. 1 (S58). The process of S58 may be regarded as a calculation process.

In this embodiment, a function approximator is exemplified as the mapping. Specifically, a fully connected feedforward neural network having one intermediate layer is exemplified. More specifically, the bias parameter $x(0)$ and the input variables $x(1)$ to $x(28+p)$ substituted by values through the process of S56 are converted by linear mapping defined by a coefficient wFjk (j=1 to m, k=0 to 28+p), and "m" values obtained through the conversion are substituted into an activation function f, whereby values of nodes in the intermediate layer are determined. Further, the values of the nodes in the intermediate layer are converted by linear mapping defined by a coefficient wSij, and individual values obtained through the conversion are substituted into an activation function g, whereby values of output variables $y(1)$, $y(2)$, $y(3)$, . . . are determined. In this embodiment, a hyperbolic tangent is exemplified as the activation function f. A softmax function is exemplified for portions of the activation function g corresponding to output variables $y(1)$ to $y(q)$, and a logistic sigmoid function is exemplified for portions of the activation function g corresponding to output variables $y(q+1)$, $y(q+2)$, . . . .

Figures 8, 9:
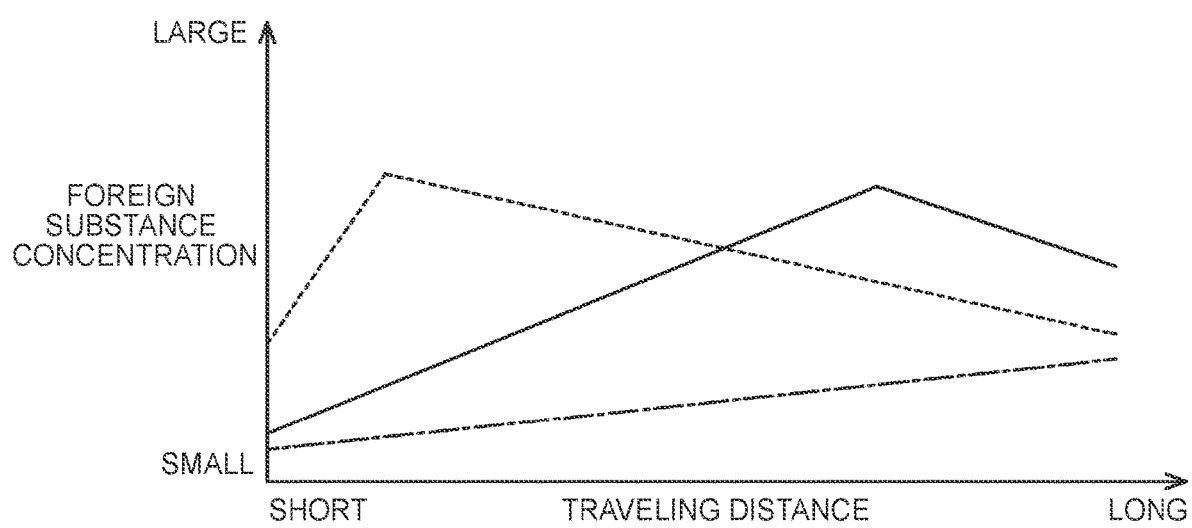
FIG. 8 is a diagram illustrating output variables of mapping according to the first embodiment.
FIG. 9 is a time chart illustrating an example of changes in the concentrations of foreign substances in oil according to the first embodiment.

The output variables $y(1)$, $y(2)$, $y(3)$, . . . indicate causes of the abnormality and the like, and are defined by variable defining data 93c stored in the storage device 93 illustrated in FIG. 1. FIG. 8 illustrates the variable defining data 93c.

As illustrated in FIG. 8, the output variables $y(1)$ to $y(q)$ among the output variables $y(1)$, $y(2)$, $y(3)$, . . . indicate abnormal sites. In FIG. 8, the output variable $y(1)$ indicates an abnormality of the clutch C1, and the output variable $y(2)$ indicates an abnormality of the clutch C2. In FIG. 8, an output variable $y(r+1)$ indicates an abnormality of a first solenoid valve among the solenoid valves 22, an output variable $y(r+2)$ indicates an abnormality of a second solenoid valve among the solenoid valves 22, and the output variable $y(q)$ indicates that the oil needs to be replaced.

The output variables $y(q+1)$, $y(q+2)$, . . . indicate whether the friction engagement elements among the candidate components in the abnormal site have remaining lives. That is, the variables indicate whether the components can still be used. In FIG. 8, the output variable $y(q+1)$ indicates whether the clutch C1 has a remaining life, and the output variable $y(q+2)$ indicates whether the clutch C2 has a remaining life. The output variables $y(q+1)$, $y(q+2)$, . . . may be regarded as remaining life variables.

Referring back to FIG. 5, when the process of S58 is completed, the CPU 92 calculates a maximum value ymax among the output variables $y(1)$ to $y(q)$ (S60). This process is a process for identifying a portion that is the cause of the abnormality. That is, this process is a process for determining whether the abnormal site is any component in the transmission 20 or the abnormality occurs because the hydraulic oil for driving the transmission 20 reaches the end of its life.

Next, the CPU 92 determines whether the maximum value ymax is equal to a value of any one of the output variables $y(1)$ to $y(r)$ (S62). This process is a process for determining whether the identified portion that is the cause of the abnormality is a friction engagement element. When the CPU 92 determines that the maximum value ymax is equal to a value of any one of the output variables $y(1)$ to $y(r)$ (S62: YES), the CPU 92 determines whether a life remains based on comparison between a threshold and a value of a variable, among the output variables $y(q+1)$, $y(q+2)$, . . . , that is related to the friction engagement element associated with the output variable equal to the maximum value ymax (S64).

When the process of S64 is completed or when the determination result in the process of S62 is negative, the CPU 92 determines whether the maximum value ymax is equal to a value of the output variable $y(q)$ (S66). This process is a process for determining whether the cause of the abnormality is the end of the life of the oil. When the CPU 92 determines that the maximum value ymax is equal to the value of the output variable $y(q)$ (S66: YES), the CPU 92 determines that the oil needs to be replaced (S68).

When the process of S68 is completed or when the determination result in the process of S66 is negative, the CPU 92 operates the display unit 97 to display the results of the processes of S60 to S68 (S70). That is, when the maximum value ymax is equal to any one of the output variables $y(1)$ to $y(r)$, the CPU 92 displays visual information indicating that a friction engagement element associated with the output variable has an abnormality, and indicating whether the component can still be used. When the maximum value ymax is equal to any one of the output variables $y(r+1)$ to $y(q-1)$, the CPU 92 displays visual information indicating that a component associated with the output variable has an abnormality. When the maximum value ymax is equal to the output variable $y(q)$, the CPU 92 displays visual information indicating that the oil needs to be replaced because the oil reaches the end of its life. The process of S70 may be regarded as a reporting process.

When the process of S70 is completed, the CPU 92 completes the process of S48 illustrated in FIG. 3. The mapping data 93b is a model trained before the shipment of the vehicle VC(1) by generating training data while accelerating deterioration by using a prototype under an extreme use condition. By using a plurality of types of oil for the prototype, the model is trained to learn a correlation between each initial foreign substance concentration and the value of the output variable. In the training data, the variable related to the necessity of oil replacement is generated in consideration of the presence or absence of an additive such as an anti-foaming agent by analyzing components of the oil. In the training data, the variable related to the remaining life is generated through measurement as to whether the wear amount of the friction engagement element reaches an upper limit value. Although the mapping data 93b is generated before the shipment of the vehicles VC(1), VC(2), . . . , the mapping data 93b is desirably updated by evaluating an output from the mapping at the time of replacement of a component after the processes illustrated in FIG. 5 after the shipment of the vehicles VC(1), VC(2), . . . , and, when determination is made erroneously, retraining the mapping by using data in that determination as training data.

Actions and effects of this embodiment are described. The CPU 52 in the vehicle VC(1) sequentially transmits, to the data center 70, data indicating conditions of the vehicle, such as the rotation speed Nm2 and the accelerator operation amount ACCP. Every time gear shifting is performed, the CPU 52 monitors the presence or absence of an abnormality of the transmission 20 or the like based on the magnitude of an absolute value of a difference between the rotation speed Nm2 and the reference rotation speed Nm2*. When the CPU 52 determines that the abnormality occurs, the CPU 52 notifies the user of the occurrence of the abnormality, and reports the occurrence of the abnormality to the manufacturer apparatus 90.

When the user is notified of the abnormality and brings the vehicle VC(1) to the repair shop 100, a part of the oil 102 in the oil pan 42 is sampled in the repair shop 100 and delivered to the vehicle manufacturer.

In the vehicle manufacturer, foreign substance concentrations are measured by analyzing the delivered oil. When the CPU 92 of the vehicle manufacturer receives the report of the occurrence of the abnormality, the CPU 92 acquires data at the time of the occurrence of the abnormality in the big data 73a by sending a request to the data center 70. The CPU 92 calculates values of the output variables y(1), y(2), . . . by inputting, to the mapping, the foreign substance concentrations Dfe1 to Dfe3, Da1 to Da3, Dm1 to Dm3, and Dfi1 to Dfi3 in addition to the conditions of the vehicle that are based on the data acquired by sending the request. Thus, an abnormal site is identified.

In this embodiment, the input variables to be used for identifying the abnormal site include not only the variables related to the conditions of the vehicle, but also the foreign substance concentrations at the time of the occurrence of the abnormality. Therefore, the abnormal site can be identified with higher accuracy than that in a case where the foreign substance concentrations are not included. For example, when the surge amount ΔNm2 serving as the variable related to the condition of the vehicle is large, it is difficult to determine, based on the surge amount ΔNm2 alone, whether the cause of the increase in the surge amount ΔNm2 is a malfunction in the solenoid valve 22 or deterioration of the friction engagement element such as the clutch C1. When the information on the foreign substance concentrations is used, it is possible to use information indicating whether the solenoid valve 22 is likely to malfunction. Therefore, the abnormal site can be identified with high accuracy.

According to this embodiment, the following actions and effects are further attained.

(1) The foreign substance concentrations in the oil are the concentrations of various types that are the iron-based, aluminum-based, mineral-based, and fiber-based foreign substances. Even at the same concentration of the foreign substance in the oil, the type of the abnormality of the transmission 20 or the likelihood of the abnormality varies depending on the type of the foreign substance. According to this embodiment, the accuracy of identification of the abnormal site can be increased.

(2) The foreign substance concentrations in the oil are the concentrations for individual sizes of the foreign substance. The type of the abnormality of the transmission 20 where the oil flows or the likelihood of the abnormality varies depending on the size of the foreign substance in the oil. According to this embodiment, the accuracy of identification of the abnormal site can be increased.

(3) The input variables x of the mapping include the foreign substance concentrations at the time of shipment of the vehicle VC(1) in addition to the foreign substance concentrations when the abnormality occurs. The foreign substance concentration in the oil may vary depending on a production line or a manufacturing timing of the vehicle VC. This embodiment uses information indicating the type of oil used at the time of shipment of the target vehicle VC(1). Thus, the values of the output variables can be calculated based on more detailed information about the condition of the oil used in the transmission 20 or the like.

(4) The input variables include the diagnosis variable Vdg. Therefore, the abnormal site can be narrowed down based on the mapping by using information related to candidates for the abnormal site identifiable in the control apparatus 50. Thus, it is possible to reduce the number of pieces of training data to be used for training the mapping data 93b and calculate the values of the output variables with high accuracy even in fewer intermediate layers and fewer dimensions of the input variables as compared to a case where the diagnosis variable Vdg is not used for the input variable.

(5) The input variables include the traveling distance TD. The foreign substance concentrations in the oil vary depending on the traveling distance TD as in an example of changes in the concentrations of different components indicated by a continuous line, a dashed line, and a long dashed short dashed line in FIG. 9. The continuous line and the dashed line in FIG. 9 indicate that the foreign substance concentration temporarily increases due to initial wear of a component in contact with the oil, but decreases when the initial wear settles down because the amount of the foreign substance filtrated by the strainer 43 is larger than the amount of the foreign substance newly dissolved in the oil. The traveling distance TD includes general information on changes in the foreign substance concentrations over time. By using the traveling distance TD, information related to a unique phenomenon occurring in the target vehicle VC(1) can be included as an input to the mapping together with information on actual foreign substance concentrations. Thus, the accuracy of identification of the abnormal site can be increased as compared to a case the traveling distance TD is not included.

(6) The surge amount ΔNm2 is used as a variable indicating the condition of the vehicle to be input to the mapping. When an abnormality occurs in the transmission 20, the rotation speed of an input shaft of the transmission 20 greatly deviates from a reference rotation speed during a change in the gear ratio. Since the surge amount ΔNm2 has information related to the abnormality, the values of the output variables can be calculated with higher accuracy by including the surge amount ΔNm2 in the input variables, as compared to a case where the surge amount ΔNm2 is not included.

(7) The time-series data of surge amounts ΔNm2 is included as an input to the mapping. As compared to a case where the values of the output variables are calculated based on a single surge amount ΔNm2 alone, the values of the output variables can be calculated based on more detailed information. Thus, the values of the output variables can be calculated with higher accuracy as compared to the case where the values of the output variables are calculated based on the single surge amount ΔNm2 alone.

(8) The input variables of the mapping include the vehicle speed SPD. The vehicle speed SPD is proportional to a rotation speed of a rotator in the transmission 20. The rotation speed is a parameter having a positive correlation to an amount of air bubbles in the oil. By including the vehicle speed SPD, the values of the output variables can be calculated while reflecting information related to the likelihood of generation of air bubbles in the oil in the transmission 20.

(9) The input variables of the mapping include the accelerator operation amount ACCP. The accelerator operation amount ACCP is a parameter for determining the driving torque command value Trq*. The magnitude of a torque to be applied to the rotator in the transmission 20 is determined depending on the driving torque command value Trq*. The magnitude of the torque to be applied to the rotator is a parameter having a positive correlation to the amount of air bubbles in the oil. By including the accelerator operation amount ACCP, the values of the output variables can be calculated while reflecting information related to the likelihood of generation of air bubbles in the oil in the transmission 20.

(10) The input variables of the mapping include both the vehicle speed SPD and the accelerator operation amount ACCP. Therefore, the gear ratio Vsft is determined. Thus, the values of the output variables can be calculated based on information as to which friction engagement element is engaged.

(11) The outputs of the mapping include the output variables y(q+1), y(q+2), . . . that are the remaining life variables each indicating information as to whether the friction engagement element corresponding to the abnormal site can still be used. Thus, it is possible to obtain information for determining whether the component having the abnormality can still be used or needs to be replaced.

(12) In response to the abnormality determination report from the vehicle VC(1), the CPU 92 of the vehicle manufacturer acquires data of the vehicle VC(1) at the time of the occurrence of the abnormality by sending a request to the data center 70. Thus, necessary data can be acquired as appropriate without prestoring data at all the times about the vehicles VC(1), VC(2), . . . in the vehicle manufacturer.

Second Embodiment

A second embodiment is described below with reference to the drawings, focusing on a difference from the first embodiment.

In the embodiment described above, the concentrations of the foreign substances in the oil are detected and added to the input variables of the mapping. The color of the oil changes depending on the concentrations of the foreign substances in the oil. In this embodiment, the information on the foreign substances in the oil is substituted by the color of the oil.

Figure 10:
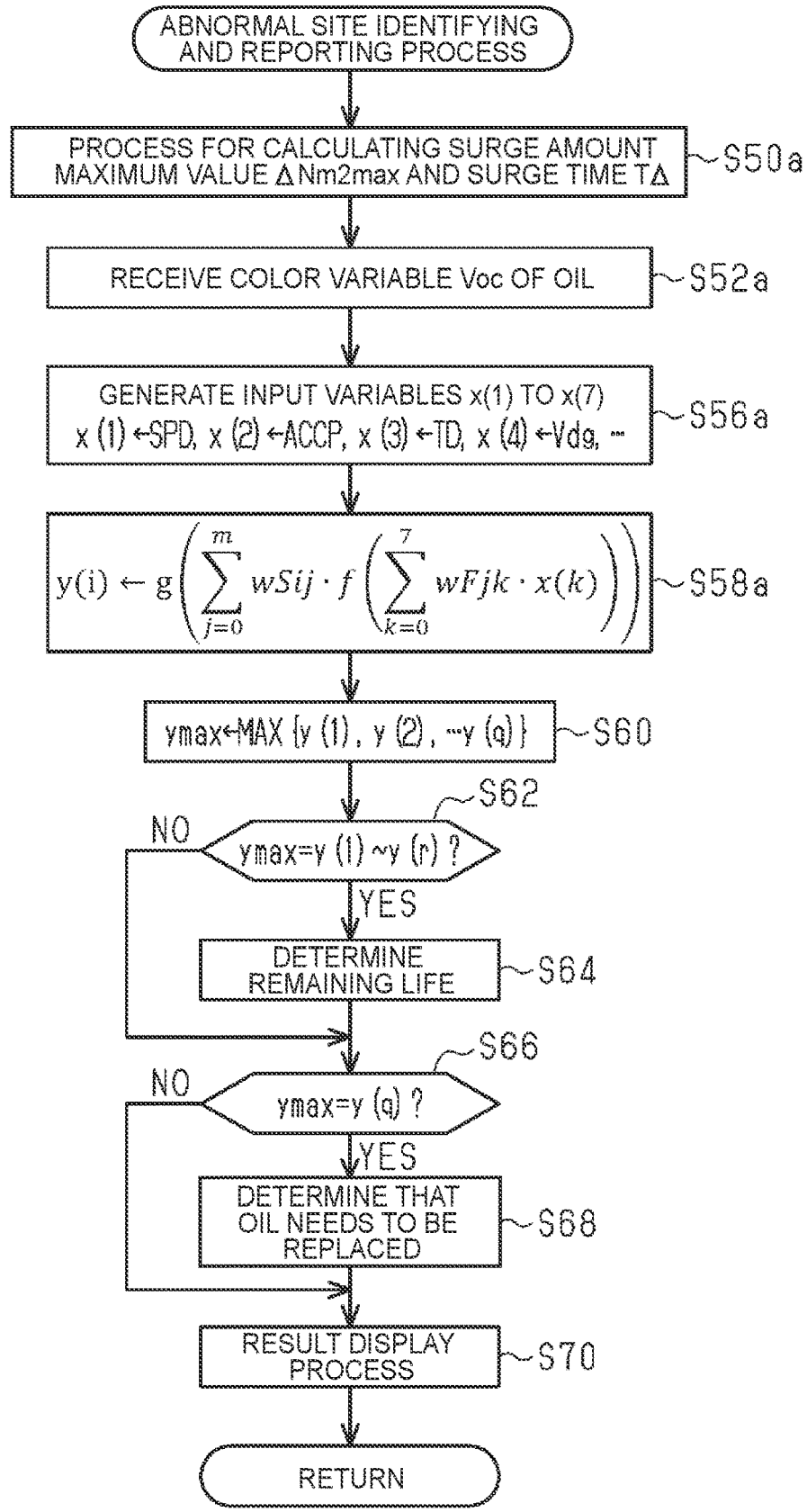
FIG. 10 is a flowchart illustrating details of a process to be executed by a manufacturer apparatus according to a second embodiment.

FIG. 10 illustrates details of the process of S48 according to this embodiment. The CPU 92 executes a program stored in the ROM 94, whereby the process illustrated in FIG. 10 is implemented. In FIG. 10, processes corresponding to the processes illustrated in FIG. 5 are represented by the same step numbers for convenience, and their description is omitted.

In a series of processes illustrated in FIG. 10, the CPU 92 first calculates a surge amount maximum value ΔNm2max and a surge time TA by inputting the data received through the process of S46 (S50*a*). The surge amount maximum value ΔNm2max is a maximum value of the surge amount ΔNm2 in a gear shifting period when an abnormality occurs. The surge time TA is a time during which the absolute value of the difference between the rotation speed Nm2 and the reference rotation speed Nm2* is equal to or larger than a specified amount. The surge amount maximum value ΔNm2max and the surge time TA in the process of S50*a* may be regarded as the deviation amount variables.

Next, the CPU 92 acquires a color variable Voc of the oil (S52*a*). In this embodiment, the color variable Voc is reported from the repair shop 100. That is, when the user who recognizes the occurrence of the abnormality through the notification process of S26 in Part (a) of FIG. 3 brings the vehicle VC(1) to the repair shop 100, a part of the oil is sampled from the oil pan 42 in the repair shop 100. An engineer in the repair shop 100 judges the color of the sampled oil, and quantifies the color as the color variable Voc. The color variable Voc is reported from the repair shop 100 to the manufacturer apparatus 90 of the vehicle manufacturer. The processes of S46, S50*a*, and S52*a* may be regarded as the acquisition process.

Figure 11:
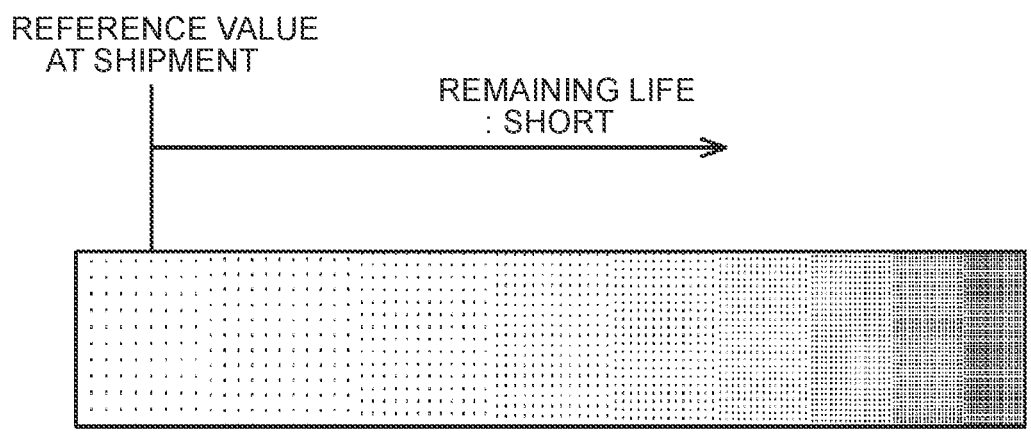
FIG. 11 is a diagram illustrating a method for quantifying a color variable of mapping according to the second embodiment.

FIG. 11 schematically illustrates colors indicated by the color variable Voc. The color turns denser toward a right side in FIG. 11 to indicate that oil deterioration advances and the remaining life of the oil decreases.

Referring back to FIG. 10, the CPU 92 substitutes the data acquired through the processes of S42, S46, S50*a*, and S52*a* for input variables x(1) to x(7) of mapping (S56*a*). That is, the CPU 92 substitutes the vehicle speed SPD for the input variable x(1), the accelerator operation amount ACCP for the input variable x(2), the traveling distance TD for the input variable x(3), the diagnosis variable Vdg for the input variable x(4), the surge amount maximum value ΔNm2max for the input variable x(5), the surge time TA for the input variable x(6), and the color variable Voc for the input variable x(7).

The CPU 92 substitutes the input variables x(1) to x(7) generated in S56*a* into mapping defined by the mapping data 93*b* (S58*a*). The mapping defined by the mapping data 93*b* according to this embodiment is different from the mapping used in the process of S58 in terms of the input variables, but is identical to the mapping used in the process of S58 in terms of the output variables. The process of S58*a* may be regarded as the calculation process.

When the process of S58*a* is completed, the CPU 92 proceeds to the process of S60. In this embodiment, the dimensions of the inputs to the mapping can be reduced by substituting the color variable Voc for the foreign substance concentrations.

In this embodiment, the following actions and effects are further attained.

(13) The input variables of the mapping include the traveling distance TD in addition to the color variable Voc. There is a tendency that the color of the oil is denser as the traveling distance TD of the vehicle increases, and is roughly determined depending on the traveling distance TD. When the color of the oil is excessively dense in relation to the traveling distance TD, oil deterioration advances due to abnormal use rather than normal use. Since the input variables of the mapping include the traveling distance TD in addition to the color variable Voc in this embodiment, more detailed information about the conditions of the oil and the transmission 20 can be input to the mapping. The color variable Voc may be regarded as a variable indicating a color.

Third Embodiment

A third embodiment is described below with reference to the drawings, focusing on a difference from the second embodiment.

Figure 12:
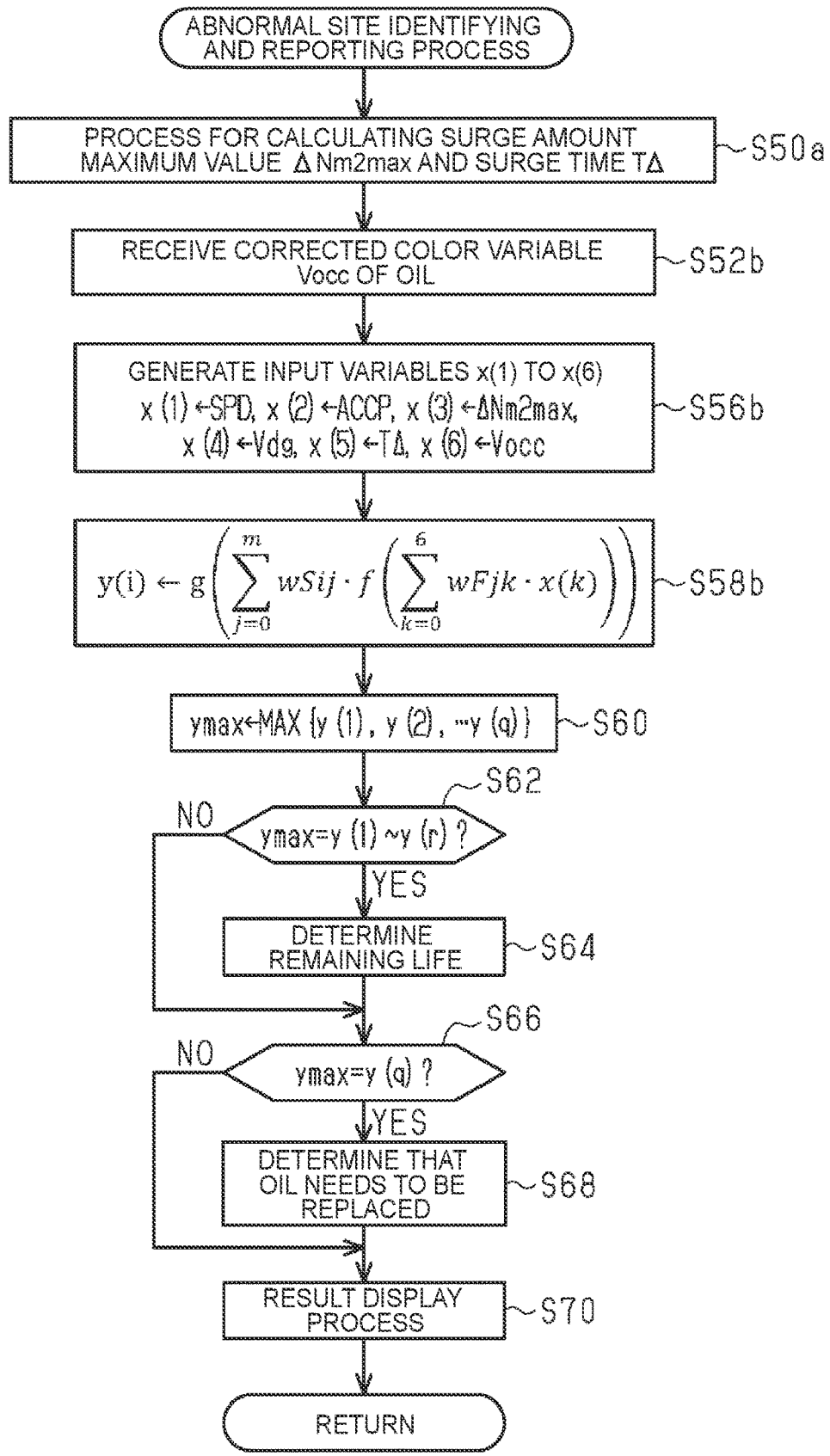
FIG. 12 is a flowchart illustrating details of a process to be executed by a manufacturer apparatus according to a third embodiment.

FIG. 12 illustrates details of the process of S48 according to this embodiment. The CPU 92 executes a program stored in the ROM 94, whereby the process illustrated in FIG. 12 is implemented. In FIG. 12, processes corresponding to the processes illustrated in FIG. 10 are represented by the same step numbers for convenience, and their description is omitted.

In a series of processes illustrated in FIG. 12, when the process of S50*a* is completed, the CPU 92 acquires a corrected color variable Vocc (S52*b*). Also in this embodiment, the color variable Vocc is reported from the repair shop 100. The color variable Vocc is obtained by a method in which the judged color of the sampled oil is quantified based on information obtained at the repair shop. That is, the color variable Vocc is equivalent to a variable obtained by a method in which the color variable Voc acquired in the process of S52a of FIG. 10 is corrected by a person based on the information obtained at the repair shop. The color variable Vocc may be regarded as a corrected variable. The processes of S46, S50a, and S52b may be regarded as the acquisition process.

Figure 13:
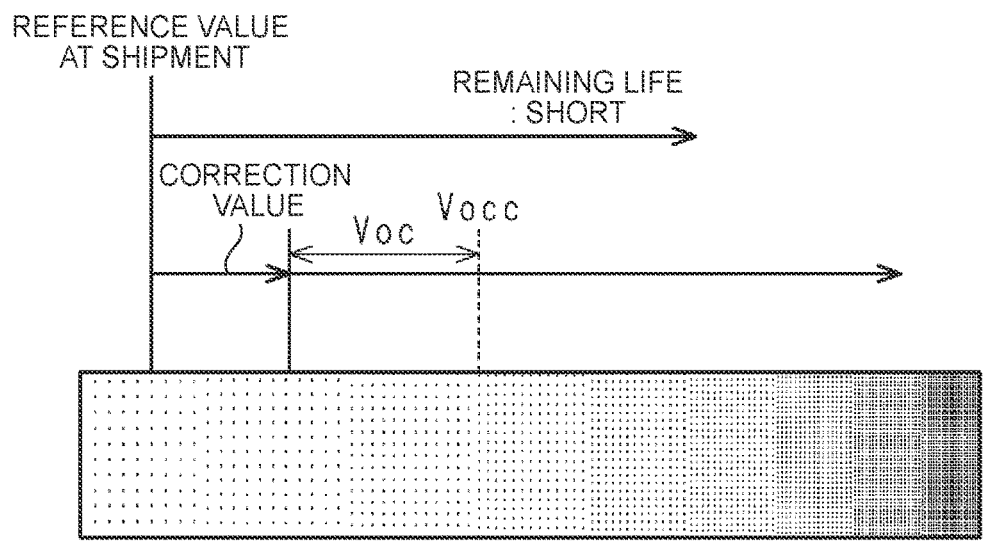
FIG. 13 is a diagram illustrating a method for quantifying a color variable according to the third embodiment.
Figure 14:
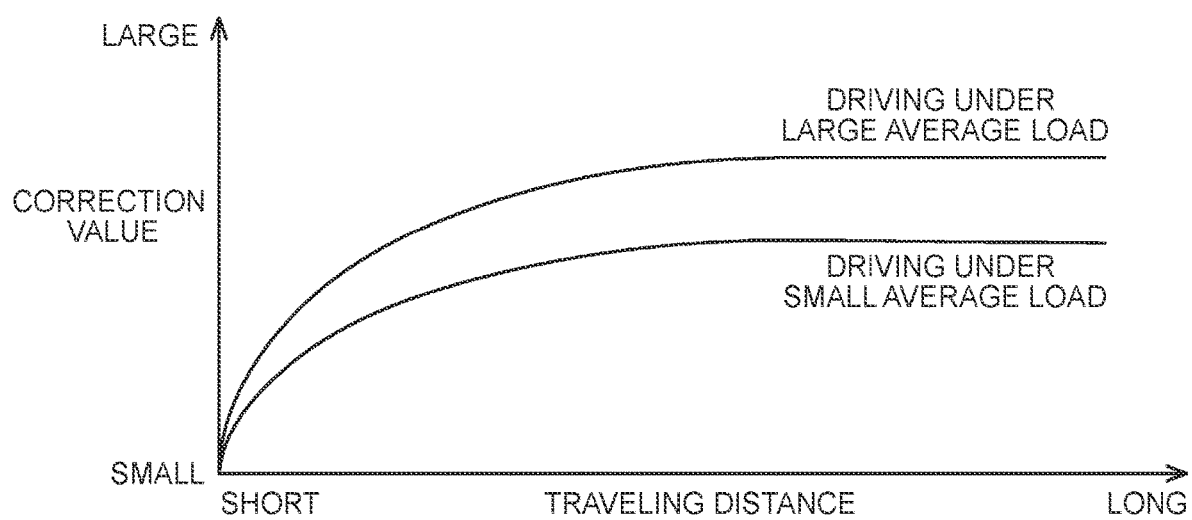
FIG. 14 is a diagram illustrating a correction value of the color variable according to the third embodiment.

FIG. 13 illustrates the color variable Vocc. This embodiment uses the color variable Vocc corrected to a denser-side value by a correction value relative to the color variable Voc indicating an actual color. FIG. 14 illustrates a method for setting the correction value. As illustrated in FIG. 14, the correction value increases as the traveling distance TD increases. In this embodiment, a hearing is conducted for the user at the repair shop 100 about actual usage of the vehicle VC, and the correction value is calculated in consideration of a result of the hearing as well. For example, when the user lives in a house near the top of a hill and always drives the vehicle by a long distance along slopes in daily commutation from the office, the load is large, and therefore a correction value larger than usual is added.

Referring back to FIG. 12, when the process of S52b is completed, the CPU 92 substitutes the acquired values for input variables x(1) to x(6) of mapping (S56b). That is, the CPU 92 substitutes the vehicle speed SPD for the input variable x(1) of the mapping, the accelerator operation amount ACCP for the input variable x(2), the surge amount maximum value ΔNm2max for the input variable x(3), the diagnosis variable Vdg for the input variable x(4), the surge time TA for the input variable x(5), and the color variable Vocc for the input variable x(6). The CPU 92 calculates values of output variables y(1), y(2), . . . by inputting the input variables x(1) to x(6) generated through the process of S56b into mapping (S58b). The mapping defined by the mapping data 93b according to this embodiment is different from the mapping used in the process of S58a in terms of the input variables, but is identical to the mapping used in the process of S58a in terms of the output variables. The process of S58b may be regarded as the calculation process.

When the process of S58b is completed, the CPU 92 proceeds to the process of S60. By correcting the color variable Vocc in this embodiment, the values of the output variables y(1), y(2), . . . that reflect more detailed information as in the case where the traveling distance TD or the like is added can be calculated without adding the traveling distance TD or the like to the input variables x.

Other Embodiments

The embodiments may be modified as follows. The embodiments and the following modified examples may be combined without causing any technical contradiction.
Foreign Substance Variable The variables indicating the concentrations for the individual types of foreign substance are not limited to the variables classified into the iron-based foreign substance concentration, the aluminum-based foreign substance concentration, the mineral-based foreign substance concentration, and the fiber-based foreign substance concentration. For example, the variables may further be classified based on types of resin or varnish. For example, the variables may be classified into two types, that is, the fiber-based foreign substance concentration and the other foreign substance concentration.

The variables indicating the concentrations for the individual types of foreign substance are not limited to the variables further classified based on their sizes.

The variables indicating the concentrations for the individual sizes of the foreign substances are not limited to the variables classified into the three groups based on the sizes. For example, the variables may be classified into two, four, five or more groups. The variables indicating the concentrations for the individual sizes of the foreign substances are not limited to the variables for the individual types of foreign substance.
Traveling Distance Variable The traveling distance variable is not limited to the traveling distance TD, and may be a total traveling time.
Deviation Amount Variable In the embodiments described above, the surge amount ΔNm2 is quantified based on the difference between the rotation speed Nm2 of the rotational shaft 16a of the second motor generator 16 and the reference rotation speed Nm2*. The applicable embodiment is not limited to this case. For example, the surge amount may be quantified based on a difference between a rotation speed of the crankshaft 12a of the internal combustion engine 12 and its reference rotation speed. The quantified surge amount has a strong correlation to a deviation of the rotation speed of the input shaft of the transmission 20 from the reference rotation speed, thereby being effective as a variable for grasping an abnormality of the transmission 20.
Diagnosis Variable In the embodiments described above, the input variables of the mapping include the value of the diagnosis variable Vdg. The applicable embodiment is not limited to this case. For example, instead of including the diagnosis variable Vdg in the input variables, a plurality of different pieces of mapping data 93b may be prepared in advance for individual values of the diagnosis variable Vdg, and mapping data to be used for calculating values of the output variables may be selected depending on the value of the diagnosis variable Vdg. Mapping defined by the selected mapping data 93b only needs to output values of output variables associated with possible abnormal sites based on the value of the diagnosis variable Vdg. Therefore, the dimensions of the output variables may be smaller than those in the mapping exemplified in the embodiments.

The preparation of different pieces of mapping data 93b for individual values of the diagnosis variable Vdg is not an essential condition in the case where the input variables do not include the diagnosis variable Vdg.
Input Variables of Mapping The variable indicating the rotation speed of the rotator in the transmission 20 is not limited to the vehicle speed SPD. For example, the variable may be the rotation speed Nm2 of the rotational shaft 16a of the second motor generator 16. The input variables need not essentially include the variable indicating the rotation speed of the rotator in the transmission 20.

The variable indicating the torque to be applied to the rotator in the transmission 20 is not limited to the accelerator operation amount ACCP. For example, the variable may be the driving torque command value Trq*. The input variables need not essentially include the variable indicating the torque to be applied to the rotator in the transmission 20.

The variable indicating the pressure of the oil in the transmission 20 is not limited to the accelerator operation amount ACCP. For example, the variable may be the line pressure command value Pr*. The input variables need not essentially include the variable indicating the pressure of the oil in the transmission 20.

For example, the initial foreign substance concentrations need not be added to the input variables in the process of FIG. 5.

In the process of FIG. 5, the time-series data of surge amounts $\Delta Nm2$ in the predetermined period determined based on the timing when the gear shifting command is issued is used as the time-series data of surge amounts $\Delta Nm2$ serving as the input variables of the mapping. The applicable embodiment is not limited to this case. For example, the time-series data of surge amounts $\Delta Nm2$ may be time-series data in every predetermined time within a period in which the surge amount $\Delta Nm2$ is equal to or larger than a specified amount. In this case, the sampling count of the surge amounts $\Delta Nm2$ in the time-series data varies. Therefore, it is appropriate to secure, as the input variables for the time-series data among the input variables of the mapping, input variables as many as a maximum value of an expected sampling count. When an actual number of pieces of time-series data is smaller than the maximum value, a predetermined value such as "0" may be input as the input variable having no corresponding data.

The surge amount variables serving as the input variables of the mapping are not limited to the time-series data of surge amounts $\Delta Nm2$ in the predetermined period, or the variable set including the surge time TA and the surge amount maximum value $\Delta Nm2max$. For example, the surge amount variable may be a cumulative value of surge amounts $\Delta Nm2$ in every predetermined time within the period in which the surge amount $\Delta Nm2$ is equal to or larger than the specified amount. For example, the surge amount variable may be a median of the surge amounts $\Delta Nm2$ in the period in which the surge amount $\Delta Nm2$ is equal to or larger than the specified amount. For example, the surge amount variable may be a surge amount $\Delta Nm2$ at a timing delayed by a predetermined time from the timing when the gear shifting command is issued.

Output Variables of Mapping

The remaining life variable is not limited to the binary variable indicating whether the component can still be used or replacement is recommended due to the end of the life. For example, the remaining life variable may be a variable indicating how many years the component can still be used. In this case, teaching data may be generated by a method in which an actual wear amount of an actually deteriorated friction engagement element is divided by a permissible upper limit value of the wear amount, a value obtained through the division is subtracted from "1", and an expected service life is multiplied by a value obtained through the subtraction.

For example, the remaining life variable may be a variable indicating a distance that can still be traveled. In this case, teaching data may be generated by a method in which an expected maximum traveling distance is multiplied by the value obtained through the subtraction described above. For example, the remaining life variable may be the value obtained by dividing the actual wear amount by the permissible upper limit value of the wear amount.

The output variables of the mapping need not essentially include the remaining life variable.

The component having a pair of relatively rotating members for which information related to the remaining life is provided by the remaining life variable is not limited to the friction engagement element such as the clutch or the brake. For example, the component may be a bearing. In this case, the remaining life may be quantified based on a flaw amount or a wear amount. The component for which information related to the remaining life is provided by the remaining life variable is not limited to the component having a pair of relatively rotating members.

The output variables of the mapping need not essentially include the variable indicating whether the oil needs to be replaced.

The output variables of the mapping may include a variable indicating that the abnormal site cannot be identified.

Mapping

In the embodiments described above, the hyperbolic tangent is exemplified as the activation function f, and the softmax function and the logistic sigmoid function are exemplified as the activation function g. The applicable embodiment is not limited to this case. For example, the activation function f may be a rectified linear unit (ReLU). In the case where the remaining life variable is the variable indicating, for example, how many years the component can still be used as described in the "Output Variables of Mapping" section, a corresponding activation function may be the ReLU.

In the embodiments described above, the neural network having one intermediate layer is exemplified as the neural network. The applicable embodiment is not limited to this case. The neural network may have two or more intermediate layers.

In the embodiments described above, the fully connected feedforward neural network is exemplified as the neural network. The applicable embodiment is not limited to this case. For example, the neural network may be a recurrent neural network (RNN). In the RNN, values of the output variables can reflect values of the input variables that are used in previous calculation as well as values currently input at one time. Therefore, the RNN is particularly effective in the case where the output variables include the variable indicating whether the oil needs to be replaced.

The function approximator serving as the mapping is not limited to the neural network. For example, the function approximator may be a regression equation having no intermediate layer. For example, the function approximator may have discriminative models configured to indicate whether each of candidates for an abnormal site is the abnormal site. In other words, function approximators as many as the candidates for the abnormal site may be provided instead of using one function approximator for identifying the abnormal site.

On-Board Component

The on-board component is not limited to the component using the oil as the hydraulic oil. For example, the on-board component may be a component using the oil only for lubrication. Also in this case, an abnormal site can be identified with higher accuracy by using information related to foreign substances in the oil, as compared to a case where the information is not used.

On-Board Component Abnormal Site Identifying System

In the embodiments described above, the oil is sampled in the repair shop 100 and delivered to the vehicle manufacturer. The applicable embodiment is not limited to this case. For example, the oil may be sampled by the vehicle manufacturer.

In the embodiments described above, the determination result showing that the transmission 20 has an abnormality is transmitted from the vehicle VC to the vehicle manufacturer. The applicable embodiment is not limited to this case. For example, the determination result may be transmitted to a dealer and repair shop where the vehicle VC is registered. For example, the determination result showing that the abnormality occurs and a timing when the abnormality occurs may be transmitted from the dealer and repair shop to the manufacturer apparatus 90. The applicable embodiment is not limited to this case. For example, the dealer and repair shop may request the data center 70 for data related to the vehicle VC around the timing when the abnormality occurs. In this case, the determination result showing that the abnormality occurs, the timing when the abnormality occurs, and the data related to the vehicle VC may be transmitted from the dealer and repair shop to the manufacturer apparatus 90, but a computer in the dealer and repair shop may execute the process of S48.

In the embodiments described above, an entity that receives, from the vehicle VC, the data to be collected in the processes of S44 and S46 as a part of the input variables of the mapping differs from an entity that calculates the values of the output variables based on the mapping. The applicable embodiment is not limited to this case. For example, the processes to be executed by the data center 70 and the manufacturer apparatus 90 may be executed at one place. The term "one place" includes apparatuses housed not only in the same casing but also in, for example, the same building or the same area. That is, the term "one place" includes a case where the manufacturer apparatus 90 and the data center 70 are communicable with each other in the same building via a local network, and a case where the manufacturer apparatus 90 and the data center 70 are communicable with each other in the same area via a local network.

In the processes of S44 and S46, the data need not essentially be collected from the data center 70. For example, when an abnormality occurs, the data may be transmitted from the vehicle VC to the manufacturer apparatus 90.

The destination of transmission of the data in the process of S14 need not essentially be the data center 70 that collects data from the vehicles VC(1), VC(2), For example, the data may be transmitted from the vehicle VC(1) to a mobile terminal of the user of the vehicle VC(1).

In the embodiments described above, when the abnormal site can be identified, the identification result is displayed on the display unit 97 arranged in an area of the vehicle manufacturer. The applicable embodiment is not limited to this case. For example, a signal related to the identification result may be transmitted to the repair shop 100 in place of the process of S70. In this case, a computer in the repair shop 100 may cause a display in the repair shop 100 to display visual information related to the identification result. In this case, the reporting process for the manufacturer apparatus 90 is a process for transmitting the signal related to the identification result, and the reporting process for the repair shop 100 is a process for receiving the signal and causing the display to display the visual information related to the identification result. Only one of the two processes constitutes the reporting process.

Execution Device

The execution device is not limited to the device that includes the CPU 92 and the ROM 94 and executes the software process. For example, the execution device may include a dedicated hardware circuit such as an application-specific integrated circuit (ASIC) configured to execute a hardware process in place of at least a part of the software process in the embodiments. That is, the execution device may have one of the following structures (a) to (c).

(a) The execution device includes a processing device configured to execute all the processes described above based on programs, and a program storage device such as a ROM that stores the programs.

(b) The execution device includes a processing device configured to execute a part of the processes described above based on programs, a program storage device, and a dedicated hardware circuit configured to execute the remaining processes.

(c) The execution device includes a dedicated hardware circuit configured to execute all the processes described above.

A plurality of devices or circuits may be provided as the software execution device including the processing device and the program storage device or as the dedicated hardware circuit.

Reporting Device

In the embodiments described above, the reporting device configured to report the information that is recognizable by the user and is related to the values of the output variables of the mapping is exemplified in the device configured to report this information as visual information. The applicable embodiment is not limited to this case. For example, the reporting device may be a device configured to report this information as audio information.

Vehicle

The vehicle is not limited to the series-parallel hybrid vehicle. For example, the vehicle may be a series hybrid vehicle or a parallel hybrid vehicle. The vehicle is not limited to the vehicle including the internal combustion engine and the motor generator as the on-board rotating machines. For example, the vehicle may have the internal combustion engine but need not have the motor generator. For example, the vehicle may have the motor generator but need not have the internal combustion engine.

What is claimed is:

1. An on-board component abnormal site identifying method comprising:
   executing, by an execution device, an acquisition process for acquiring values of input variables in a state in which mapping data for defining mapping is stored in a storage device, the mapping including, as the input variables, a foreign substance variable related to a foreign substance in oil flowing through an on-board component when an abnormality occurs in the on-board component, and including, as an output variable, an abnormal site variable indicating an abnormal site of the on-board component;
   executing, by the execution device, a calculation process for calculating a value of the abnormal site variable by inputting, to the mapping, the values of the input variables that are acquired through the acquisition process; and
   executing, by the execution device, a reporting process for reporting a calculation result of the calculation process by operating a reporting device.

2. The on-board component abnormal site identifying method according to claim 1, wherein the foreign substance variable includes variables indicating concentrations for individual types of the foreign substance in the flowing oil.

3. The on-board component abnormal site identifying method according to claim 1, wherein the foreign substance variable includes variables indicating concentrations for individual sizes of the foreign substance in the flowing oil.

4. The on-board component abnormal site identifying method according to claim 1, wherein the foreign substance variable is a variable indicating a color of the flowing oil.

5. The on-board component abnormal site identifying method according to claim 4, wherein the input variables include a traveling distance variable correlated to a total traveling distance of a vehicle where the on-board component is mounted.

6. The on-board component abnormal site identifying method according to claim 1, wherein the acquisition process includes a process for acquiring, as the foreign substance variable, a variable obtained by correcting a variable indicating a color of the flowing oil to a denser side when a driving load is large than a case where the driving load is small, the driving load being a driving load in a driving record of a vehicle including the on-board component.

7. The on-board component abnormal site identifying method according to claim 1, wherein:
the on-board component includes a rotating machine and a stepped transmission; and
the input variables include a deviation amount variable indicating a deviation amount between a reference rotation speed and an actual rotation speed of a rotational shaft of the rotating machine when a gear ratio is changed by the stepped transmission.

8. The on-board component abnormal site identifying method according to claim 7, wherein the acquisition process includes a process for acquiring, as the deviation amount variable, time-series data of variables indicating the deviation amount at a plurality of timings when the gear ratio is changed.

9. The on-board component abnormal site identifying method according to claim 7, wherein candidates for the abnormal site indicated by the abnormal site variable include a solenoid valve of the stepped transmission and a friction engagement element of the stepped transmission.

10. The on-board component abnormal site identifying method according to claim 1, wherein:
the mapping includes, as the output variable, a remaining life variable in addition to the abnormal site variable, the remaining life variable indicating information as to whether a component corresponding to the abnormal site is still usable; and
the calculation process includes a process for calculating a value of the remaining life variable in addition to the abnormal site variable.

11. The on-board component abnormal site identifying method according to claim 1, wherein:
the execution device is configured to make determination as to whether the abnormality occurs in the on-board component, and execute the calculation process when determining that the abnormality occurs in the on-board component;
the mapping includes, as the input variables, a diagnosis variable indicating a range in which the abnormality occurs through the determination; and
the acquisition process includes a process for acquiring a value of the diagnosis variable serving as one of the input variables.

12. The on-board component abnormal site identifying method according to claim 1, wherein:
the on-board component includes a rotating machine and a stepped transmission;
the input variables include a deviation amount variable indicating a deviation amount between a reference rotation speed and an actual rotation speed of a rotational shaft of the rotating machine when a gear ratio is changed by the stepped transmission;
a vehicle where the on-board component is mounted is configured to execute
a speed transmission process for transmitting speed variables indicating the rotation speed to an outside of the vehicle,
a determination process for determining whether the abnormality occurs in the stepped transmission, and
a result transmission process for transmitting a determination result when determining that the abnormality occurs through the determination process;
the execution device is configured to execute a reception process for receiving the determination result; and
the acquisition process includes a process for acquiring a value of the deviation amount variable based on selection of a speed variable associated with the determination result from among the speed variables transmitted through the speed transmission process.

13. An on-board component abnormal site identifying system comprising:
the execution device in the on-board component abnormal site identifying method according to claim 12;
the storage device in the on-board component abnormal site identifying method according to claim 12;
the reporting device in the on-board component abnormal site identifying method according to claim 12; and
the vehicle in the on-board component abnormal site identifying method according to claim 12.

14. An on-board component abnormal site identifying apparatus comprising the execution device in the on-board component abnormal site identifying system according to claim 13, the execution device including one or more execution devices, at least one of the one or more execution devices being configured to execute the calculation process.

15. An on-board component abnormal site report control apparatus comprising the execution device in the on-board component abnormal site identifying system according to claim 13, the execution device including one or more execution devices, at least one of the one or more execution devices being configured to execute the reporting process.

16. A vehicle control apparatus comprising a processor configured to execute the speed transmission process, the determination process, and the result transmission process in the on-board component abnormal site identifying system according to claim 13.

* * * * *